US 8,888,654 B2

(12) United States Patent
Iizuka

(10) Patent No.: US 8,888,654 B2
(45) Date of Patent: Nov. 18, 2014

(54) CONTROL DEVICE FOR VEHICLE, AND MOTORCYCLE

(75) Inventor: Shinya Iizuka, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 14/003,554

(22) PCT Filed: Jan. 26, 2012

(86) PCT No.: PCT/JP2012/051670
§ 371 (c)(1),
(2), (4) Date: Sep. 6, 2013

(87) PCT Pub. No.: WO2012/120937
PCT Pub. Date: Sep. 13, 2012

(65) Prior Publication Data
US 2014/0004999 A1 Jan. 2, 2014

(30) Foreign Application Priority Data

Mar. 9, 2011 (JP) ................................. 2011-052180

(51) Int. Cl.
B60W 10/00 (2006.01)
B60W 10/11 (2012.01)
F16D 48/06 (2006.01)
B60W 10/02 (2006.01)
F16H 61/688 (2006.01)
F16H 61/04 (2006.01)

(52) U.S. Cl.
CPC .............. B60W 10/11 (2013.01); F16D 48/06 (2013.01); B60W 10/02 (2013.01); F16H 61/688 (2013.01); F16H 61/0437 (2013.01); F16D 2500/1086 (2013.01); F16D 2500/1117 (2013.01); F16D 2500/50653 (2013.01)
USPC .......................................................... 477/79

(58) Field of Classification Search
USPC ............. 477/70, 79, 166, 174; 701/51, 67, 68
See application file for complete search history.

(56) References Cited

U.S. PATENT DOCUMENTS 6,526,343 B2 * 2/2003 Saito et al. ...................... 701/51
8,392,076 B2 * 3/2013 Kobayashi et al. ............. 701/51
(Continued)

FOREIGN PATENT DOCUMENTS

JP 2007-92907 A 4/2007
JP 2010-106982 A 5/2010
JP 2010-106983 A 5/2010

OTHER PUBLICATIONS

English translation of Official Communication issued in corresponding International Application PCT/JP2012051670, mailed on Sep. 19, 2013.

(Continued)

Primary Examiner — Justin Holmes
(74) Attorney, Agent, or Firm — Keating & Bennett, LLP

(57) ABSTRACT

In a vehicle including two paths as torque transmission paths from an engine to an output shaft of a transmission, each of the paths provided with a clutch and a transmission mechanism, a gear shift shock due to a torque generated at the moment when the paired gears of the next gear level are engaged is significantly reduced. In normal travel control, a control device sets a transmitted torque capacity of each of the clutches in the two paths at maximum. Also, in the normal travel control, the control device sets the paired gears of the transmission mechanism in a previous path that is one of the paths, in an engaged state, and sets the transmission mechanism in a next path that is the other path, in a neutral state. When a gear shift command is generated, the control device lowers the transmitted torque capacity of the clutch in the next path. After that, the control device engages the paired gears of the transmission mechanism in the next path with each other, before the transmitted torque capacity of the clutch in the next path reaches a minimum value.

12 Claims, 17 Drawing Sheets

(56) References Cited

U.S. PATENT DOCUMENTS

| | | |
|---|---|---|
| 2007/0068297 A1 | 3/2007 | Hori et al. |
| 2007/0294017 A1* | 12/2007 | Joshi et al. .................. 701/67 |
| 2010/0107792 A1 | 5/2010 | Saitoh |
| 2010/0107809 A1 | 5/2010 | Saitoh |
| 2010/0108422 A1 | 5/2010 | Saitoh |
| 2010/0228412 A1* | 9/2010 | Sah ............................. 701/22 |
| 2010/0268427 A1* | 10/2010 | Kabrich ....................... 701/55 |
| 2011/0054752 A1* | 3/2011 | Arai ............................. 701/67 |

OTHER PUBLICATIONS

Official Communication issued in International Patent Application No. PCT/JP2012/051670, mailed on Apr. 10, 2012.

* cited by examiner

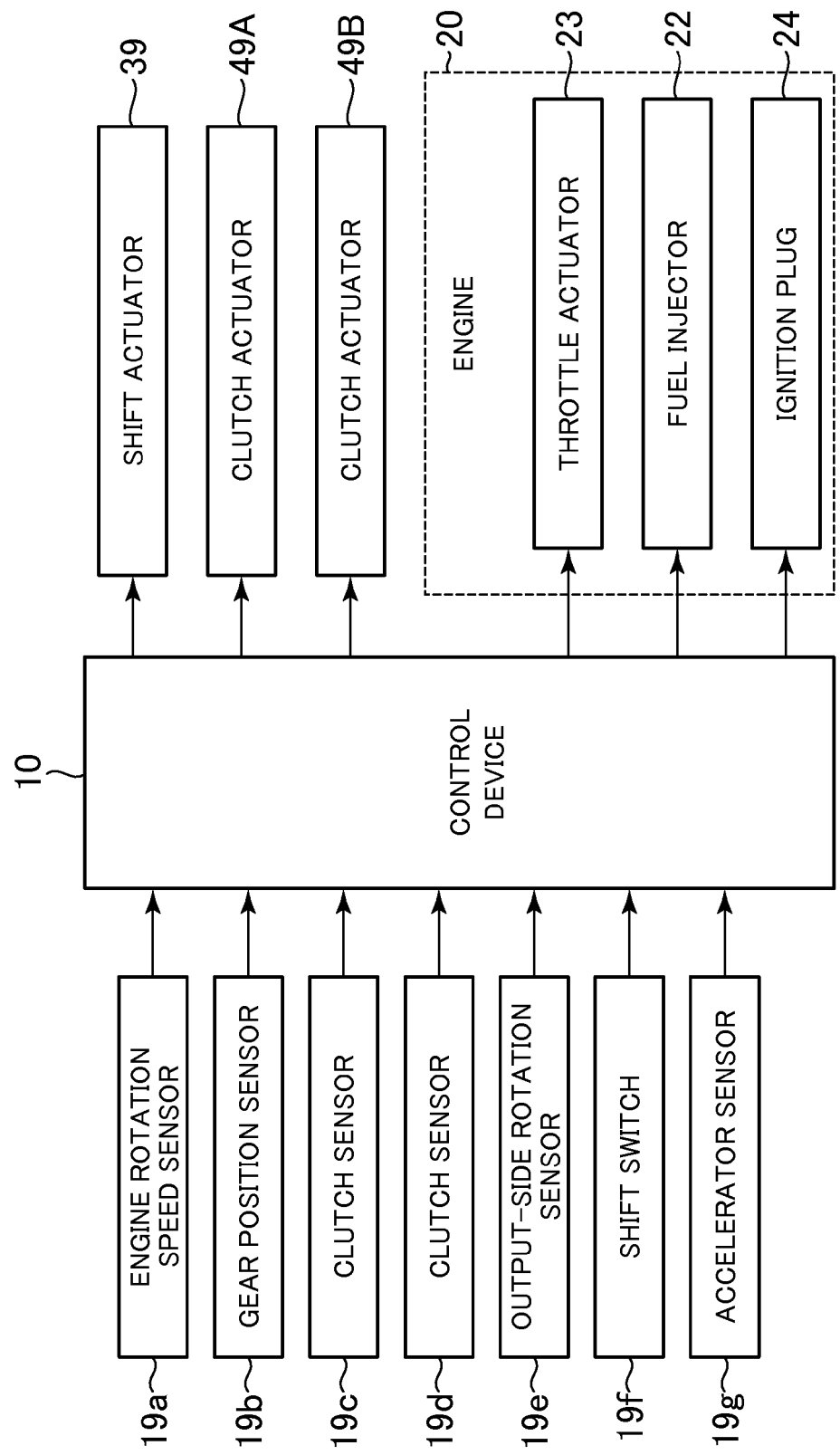

FIG.4A
(a) 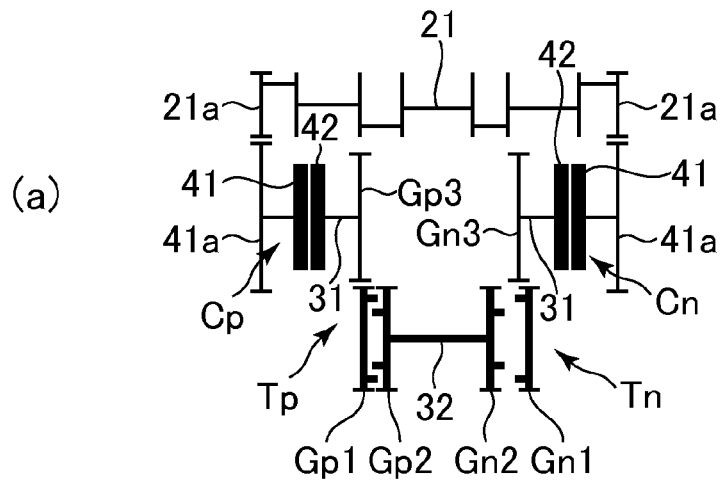
(b) 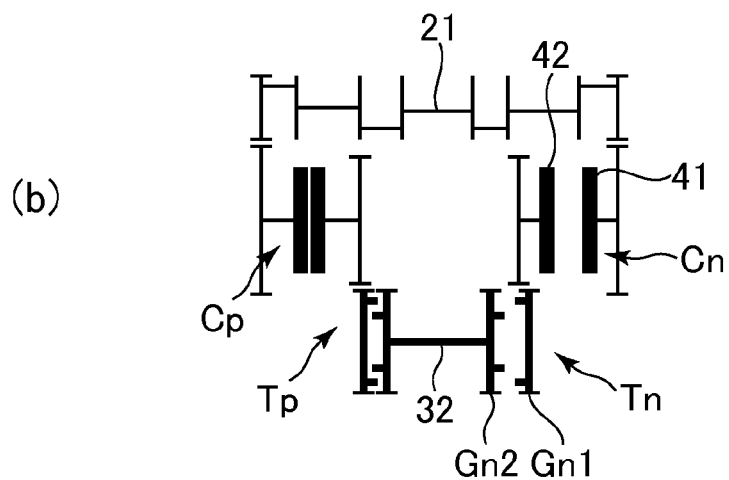
(c) 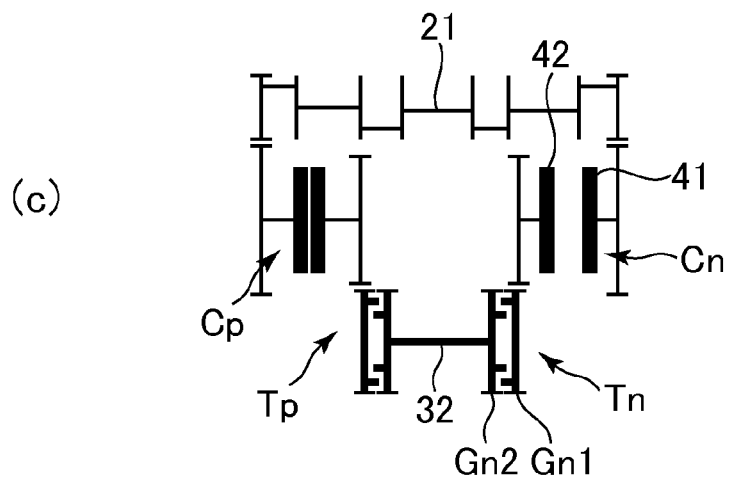

FIG.4B
(d)
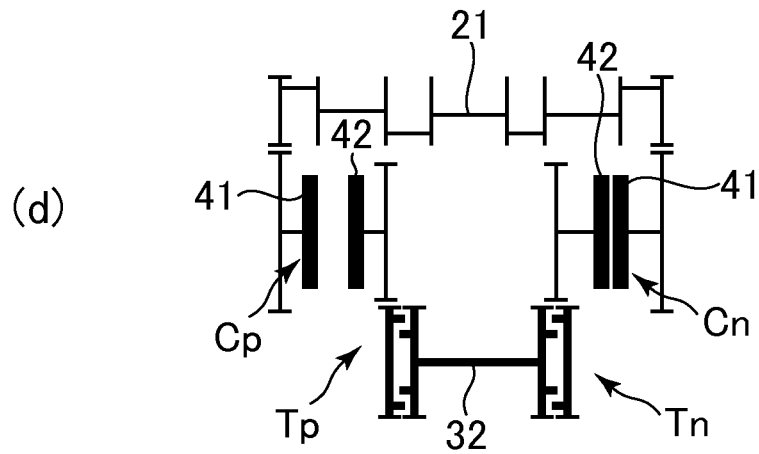
(e)
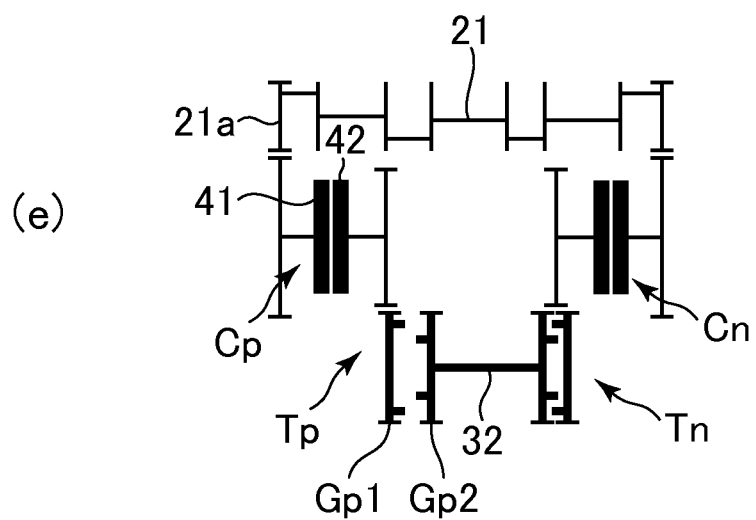

FIG.6A
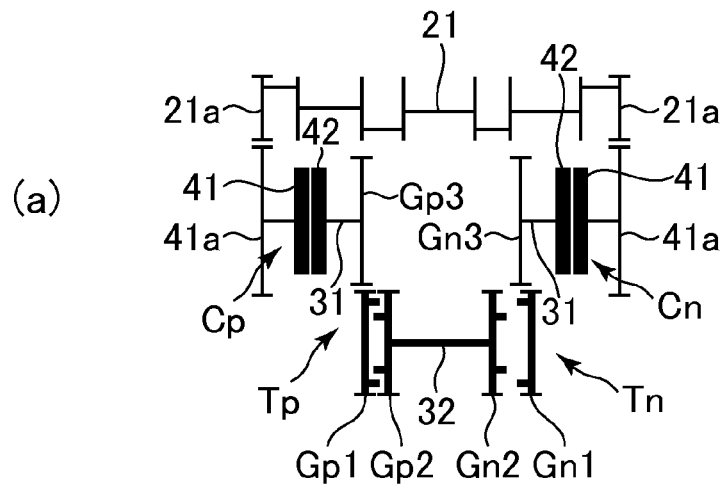
(a)
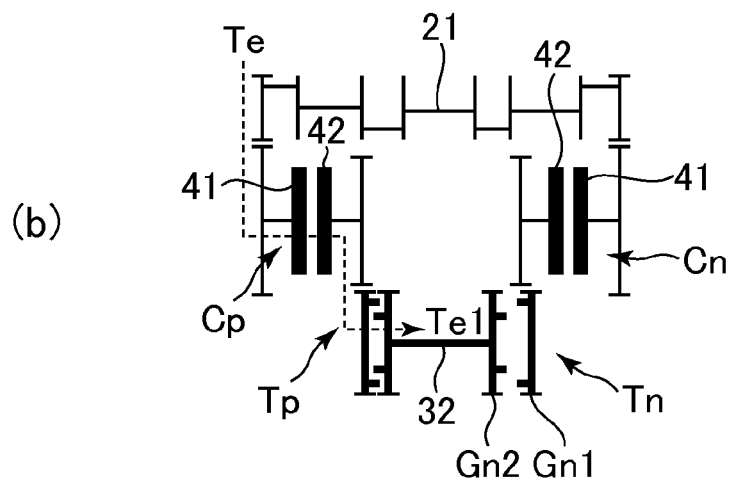
(b)
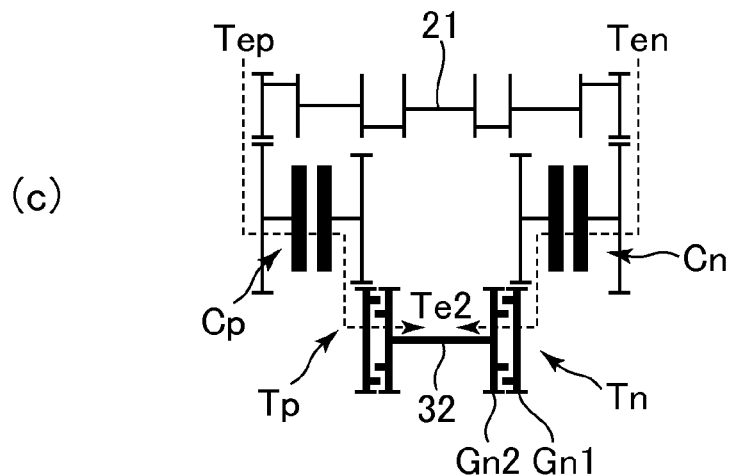
(c)

FIG.6B
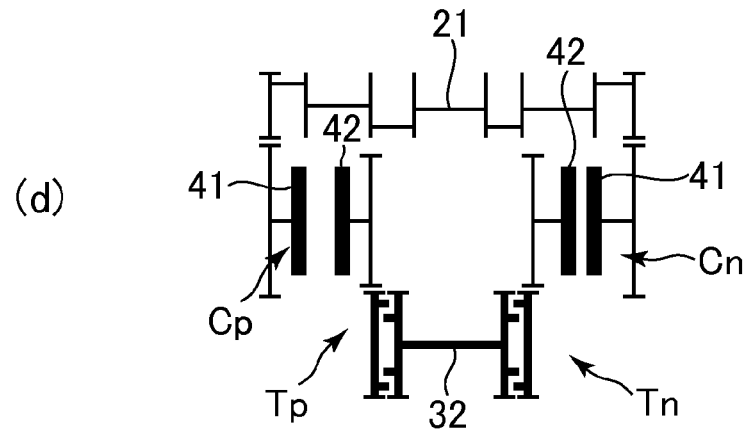
(d)
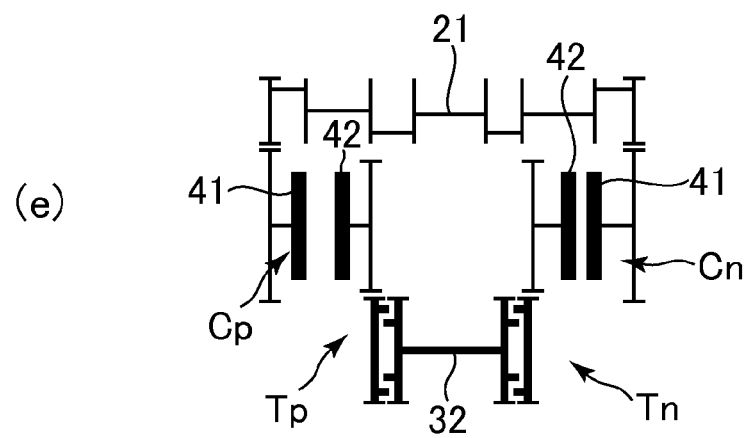
(e)
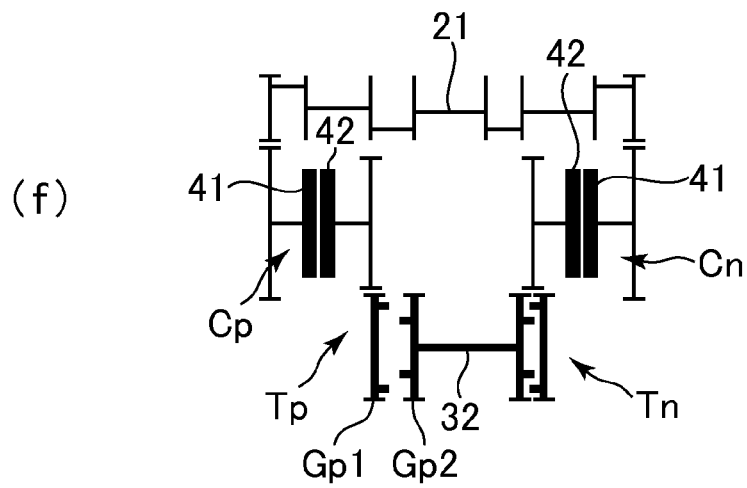
(f)

FIG.10
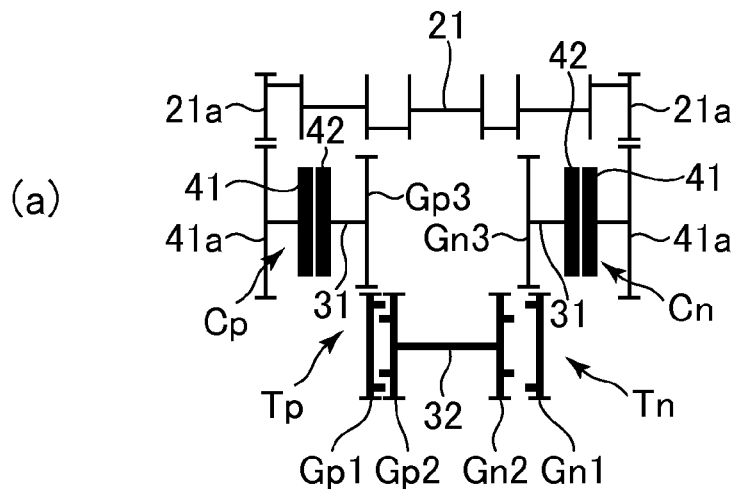
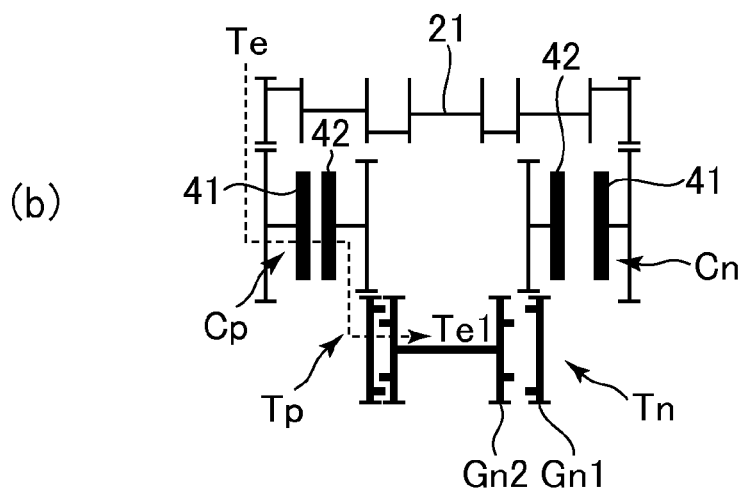
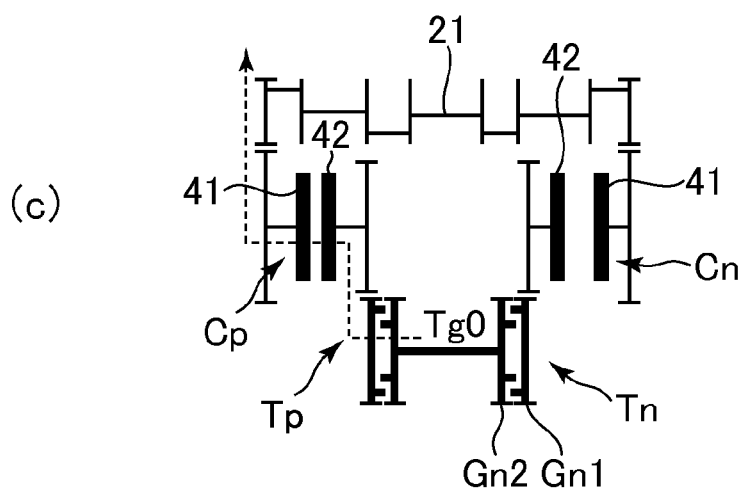

CONTROL DEVICE FOR VEHICLE, AND MOTORCYCLE

BACKGROUND OF THE PRESENT INVENTION

1. Field of the Present Invention

The present invention relates to a control device for a vehicle which drives actuators to operate a clutch and a transmission mechanism provided in each of two paths to transmit an engine torque, and a motorcycle.

2. Description of the Related Art

Conventionally, a motorcycle in which a clutch and gears of a transmission mechanism are operated by an actuator is known. JP2010-106982A discloses such a motorcycle. The motorcycle of JP2010-106982A has two paths for transmitting an engine torque. Each path includes a clutch and a transmission mechanism arranged downstream of the clutch, and the two transmission mechanisms share an output shaft. One transmission mechanism includes plural gears for realizing odd-number gear levels, and the other transmission mechanism includes plural gears for realizing even-number gear levels. The plural gears of each transmission mechanism include gears rotating together with a driven member of the clutch, and gears rotating together with the output shaft. The transmission mechanism of JP2010-106982A is a dog clutch type. That is, dog-teeth and dog-holes are formed on the gears rotating together with the driven member of the clutch and the gears rotating together with the output shaft, respectively. The dog-teeth are fitted in the dog-holes, thus engaging the two gears with each other.

In normal travel of the motorcycle of this type, both of the two clutches are set in an engaged state. Meanwhile, one of the two transmission mechanism is set in a neutral state (that is, in a state where none of the gears is engaged), and in the other transmission mechanism, paired gears for the gear level set in the travel are engaged. Thus, an engine torque is transmitted to the rear wheel via the path including the transmission mechanism in the engaged state.

When a gear shift command is generated, the clutches and the transmission mechanisms are operated through the following procedure, so that the path to transmit a torque is switched. The clutch (hereinafter, next clutch) in the path to transmit the torque after a gear shift (next path) is completely disengaged. After that, the paired gears of the transmission mechanism (hereinafter, next transmission mechanism) arranged downstream of the next clutch are engaged. Then, after the paired gears of the next transmission mechanism are engaged, the clutch to be set in the engaged state is switched to the next clutch from the clutch which has transmitted the torque before the gear shift (hereinafter, previous clutch). After that, the paired gears of the transmission mechanism (hereinafter, previous transmission mechanism) downstream of the previous clutch are disengaged.

However, before a gear shift command is generated, there is a difference in rotation speed between the paired gears forming the next gear level (paired gears in the next transmission mechanism). Therefore, at the moment when these two gears are engaged with each other in response to the gear shift command, the rotation speed of one gear of the two gears and the rotation speed of the driven member of the next clutch rotating together with the one gear change instantly and thus the changes of the rotation speed generate a torque. Since this torque is transmitted to the rear wheel, a shock is generated and thus smooth traveling is obstructed.

SUMMARY OF THE PRESENT INVENTION

Preferred embodiments of the present invention provide a control device for a vehicle that significantly reduces or prevents a shock generated at the moment paired gears of a transmission mechanism are engaged.

A vehicle equipped with a control device according to a preferred embodiment of the present invention includes two paths to transmit an engine torque. A clutch and a transmission mechanism arranged downstream of the clutch are provided in each of the two paths. The transmission mechanisms in the two paths share an output shaft, and each of the transmission mechanisms includes a first gear that rotates together with a driven member of the clutch, and a second gear that rotates together with the output shaft and is engageable with the first gear by a dog clutch. The control device is arranged and programmed to execute normal travel control, next clutch capacity reduction control, and next gear engagement control. In the normal travel control, the control device sets a transmitted torque capacity of both of the clutches to a value that the clutch has in an engaged state, and also sets the transmission mechanism in a previous path that is one of the two paths, in the engaged state where the first gear and the second gear are engaged with each other, and sets the transmission mechanism in a next path that is the other path, in a neutral state where the first gear and the second gear are not engaged with each other. Also, in the clutch capacity reduction control, the control device lowers the transmitted torque capacity of the clutch in the next path, in response to a gear shift command generated during the normal travel control. Meanwhile, in the next gear engagement control, the control device engages the first gear and the second gear of the transmission mechanism in the next path with each other in a state where the transmitted torque capacity of the clutch in the next path is higher than the transmitted torque capacity at the time when the clutch is disengaged, after the next clutch capacity reduction control is started.

According to a preferred embodiment of the present invention, the two gears of the transmission mechanism in the next path become engaged with each other before the clutch in the next path is disengaged. Therefore, at the moment when the two gears are engaged, an engine torque starts to be transmitted to the output shaft via both of the two paths. The gear ratio before the gear shift and the gear ratio after the gear shift are different from each other, and thus the engine torque transmitted to the output shaft changes at the moment when the two gears are engaged. Consequently, the change in the engine torque can compensate for a torque generated by engaging the two gears, that is, a torque generated by a sudden change in rotation speed of the driven member or the like of the clutch in the next path. As a result, the shock due to the engagement of the two gears is significantly reduced or prevented.

Also, according to a preferred embodiment of the present invention, in the next clutch capacity reduction control, the control device may set a target value for the transmitted torque capacity of the clutch in the next path to a value higher than a transmitted torque capacity at the time when the clutch is disengaged. According to this preferred embodiment, the two gears of the transmission mechanism in the next path is securely engaged with each other before the clutch in the next path is disengaged. In this preferred embodiment, the control device may calculate the target value based on information related to the difference in rotation speed between the first gear and the second gear in a state before the two gears become engaged by the next gear engagement control. By doing so, an appropriate target value corresponding to the difference in rotation speed can be set. The difference in rotation speed varies, depending on the gear level according to the gear shift command. Therefore, the control device may calculate the target value based on the gear level according to the gear shift command as information related to the difference in rotation speed between the two gears. Moreover, in this preferred embodiment, the target value may be a predetermined fixed value. Thus, processing executed by the control device during gear shift is simplified.

Also, according to another preferred embodiment of the present invention, the control device may execute previous clutch capacity reduction control in which the transmitted torque capacity of the clutch in the previous path is lowered, before the first gear and the second gear of the transmission mechanism in the next path are engaged with each other. According to this preferred embodiment, the time required for gear shift is significantly reduced.

Moreover, according to still another preferred embodiment of the present invention, the control device may set the target value higher than the transmitted torque capacity at the time when the clutch is disengaged, when a shift-up command is generated as the gear shift command. According to this preferred embodiment of the present invention, a shift-up that is comfortable to the rider is realized.

Also, according to another preferred embodiment of the present invention, the control device may execute clutch switch control in which the target value is raised from the transmitted torque capacity higher than the transmitted torque capacity at the time when the clutch is disengaged, after the first gear and the second gear of the transmission mechanism in the next path are engaged with each other. According to this preferred embodiment, the time required for gear shift is significantly reduced, compared with the case where the target value is raised from the transmitted torque capacity at the time when the clutch is disengaged (that is, a minimum value of capacity).

Moreover, another control device according to a preferred embodiment of the present invention executes normal travel control, previous clutch capacity reduction control, next clutch capacity reduction control, and next gear engagement control. In the normal travel control, the control device sets a transmitted torque capacity of each of the clutches to a value that the clutch has in an engaged state, and also sets the transmission mechanism in a previous path that is one of the two paths, in an engaged state where the first gear and the second gear are engaged with each other, and sets the transmission mechanism in a next path that is the other path, in a neutral state where the first gear and the second gear are not engaged with each other. Also, in the previous clutch capacity reduction control, the control device lowers the transmitted torque capacity of the clutch in the previous path, in response to a gear shift command generated during the normal travel control. Meanwhile, in the next clutch capacity reduction control, the control device lowers the transmitted torque capacity of the clutch in the next path. In the next gear engagement control, the control device engages the first gear and the second gear of the transmission mechanism in the next path with each other in a state where the transmitted torque capacity of the clutch in the previous path is higher than a transmitted torque capacity corresponding to a torque outputted by the engine, after the previous clutch capacity reduction control and the next clutch capacity reduction control are started. According to this preferred embodiment, in the state where the transmitted torque capacity of the clutch in the previous path is higher than the transmitted torque capacity corresponding to the torque outputted by the engine, the driven member and the drive member of the clutch rotate at the same rotation speed. Therefore, when the two gears of the transmission mechanism in the next path become engaged with each other, a portion of the torque generated by the engagement of the two gears is transmitted to the engine via the clutch in the previous path. Consequently, the shock is significantly reduced or prevented.

Also, according to a preferred embodiment of the present invention, in the previous clutch capacity reduction control, the control device may set a target value for the transmitted torque capacity of the clutch in the previous path, to a higher value than the transmitted torque capacity corresponding to the torque outputted by the engine. According to this preferred embodiment, the two gears of the transmission mechanism in the next path are engaged in the state in which the transmitted torque capacity of the clutch in the previous path is securely higher than the transmitted torque capacity corresponding to the torque outputted by the engine.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a block diagram showing the configuration of the motorcycle.

FIG. 4A is a view for explaining the outline of a conventional transmission control.

FIG. 4B is a view for explaining the outline of a conventional transmission control.

FIG. 6A is a view for explaining power-on shift-up operation executed by the control device according to a first preferred embodiment.

FIG. 6B is a view for explaining a power-on shift-up operation executed by the control device according to the first preferred embodiment of the present invention.

FIG. 10 is a view for explaining the outline of control executed by the control device according to a second preferred embodiment of the present invention.

DETAILED DESCRIPTION OF THE PREFERRED EMBODIMENTS

Figure 1:
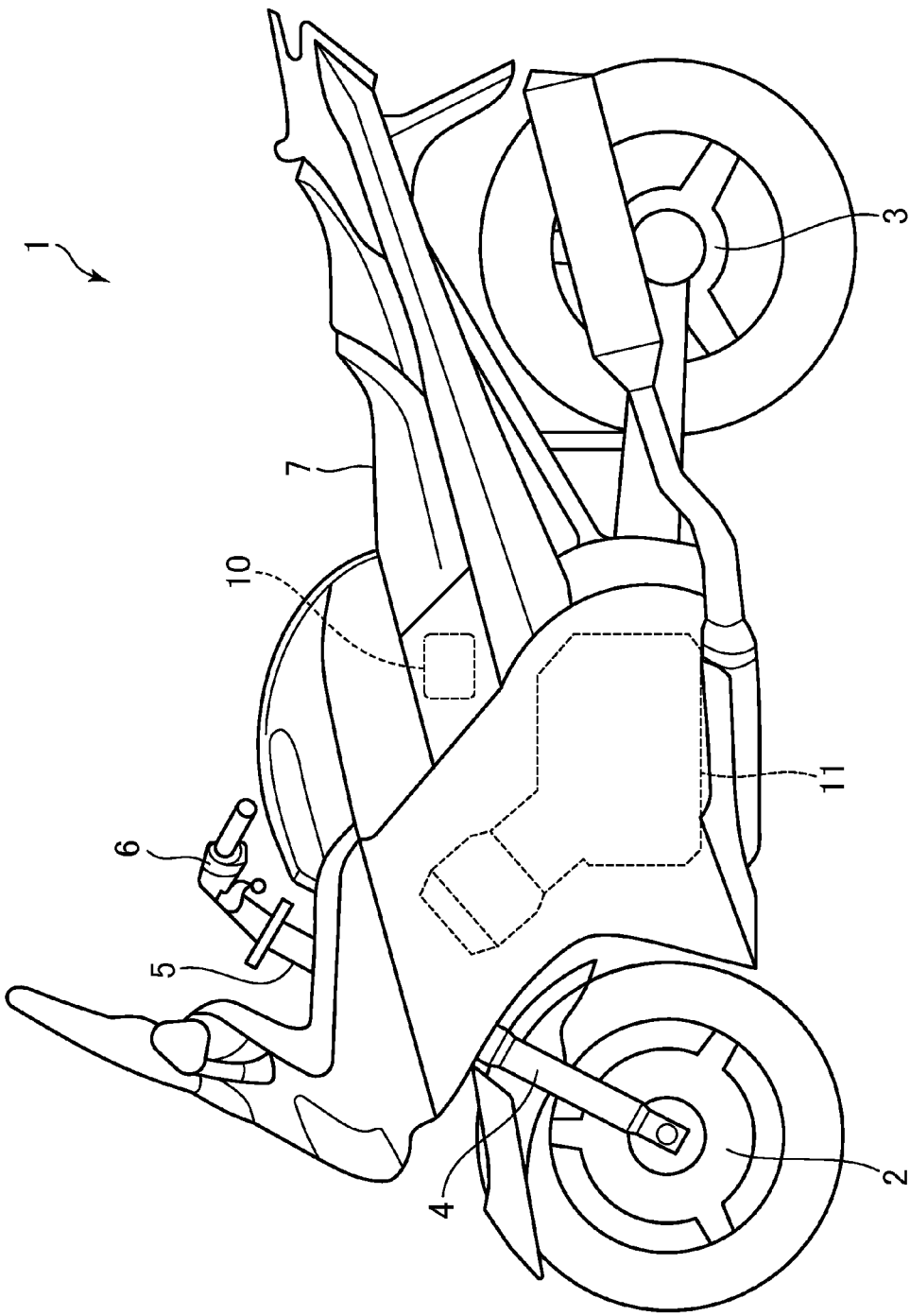
FIG. 1 is a side view of a motorcycle including a control device according to a preferred embodiment of the present invention.
Figure 2:
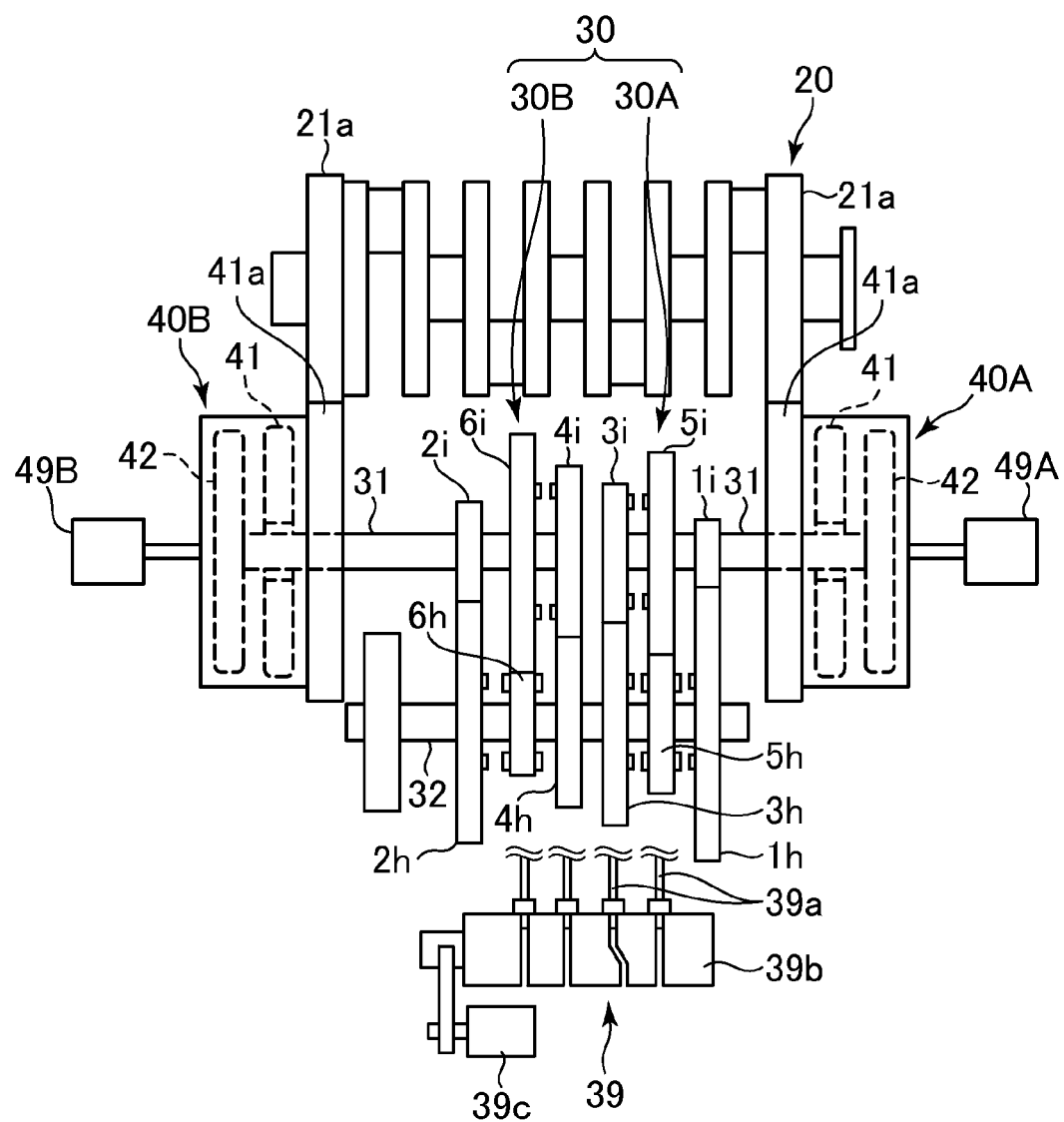
FIG. 2 is a schematic view of a mechanism provided in a torque transmission path from an engine to an output shaft.

Hereinafter, preferred embodiments of the present invention will be described with reference to the drawings. FIG. 1 is a side view of a motorcycle 1 including a control device 10 as an example of a preferred embodiment of the present invention. FIG. 2 is a schematic view of a mechanism provided in a torque transmission path extending from an engine 20 to an output shaft 32 of the engine 20. FIG. 3 is a block diagram showing the configuration of the motorcycle 1.

As shown in FIG. 1, the motorcycle 1 includes a front wheel 2, a rear wheel 3, and an engine unit 11. The front wheel 2 is supported at a lower end of a front fork 4. A steering shaft 5 rotatably supported at a front portion of a vehicle body frame (not shown) is connected to an upper portion of the front fork 4. A steering 6 is provided above the steering shaft 5. The steering 6, the front fork 4 and the front wheel 2 are integrally rotatable to the left and right about the steering shaft 5.

A seat 7 for a rider to sit is arranged to the rear from the steering 6. The rear wheel 3 is arranged on the rear side of the engine unit 11. A torque outputted from a transmission 30 (see FIG. 2) is transmitted to the rear wheel 3 via a torque transmission member such as a chain, belt or drive shaft (not shown).

As shown in FIG. 2, the engine unit 11 includes the engine 20 and the transmission 30. The motorcycle 1 preferably is a so-called twin-clutch vehicle, for example. The engine unit 11 includes a first clutch 40A and a second clutch 40B. The engine 20 includes a crank shaft 21. A torque of the engine 20 (rotation of the crank shaft 21) is inputted to each of the first clutch 40A and the second clutch 40B. The first clutch 40A and the second clutch 40B in this example include a drive member 41 that is interlocked with the rotation of the crank shaft 21. In the example shown in FIG. 2, the crank shaft 21 includes two primary gears 21a. Each of the drive member 41 of the first clutch 40A and the drive member 41 of the second clutch 40B includes a primary gear 41a meshed with the primary gear 21a.

The first clutch 40A and the second clutch 40B include a driven member 42. The first clutch 40A and the second clutch 40B are, for example, single-plate or multi-plate friction clutches. That is, when the drive member 41 and the driven member 42 are pressed to each other in an axial direction, a torque is transmitted between these members. The drive member 41 is, for example, a friction disk, and the driven member 42 is, for example, a clutch disk.

The transmission 30 includes a first transmission mechanism 30A and a second transmission mechanism 30B. The first transmission mechanism 30A and the second transmission mechanism 30B are arranged downstream of the first clutch 40A and the second clutch 40B, respectively. That is, an input shaft 31 is provided on each of the first transmission mechanism 30A and the second transmission mechanism 30B. The input shaft 31 of the first transmission mechanism 30A is connected to the driven member 42 of the first clutch 40A, and a torque is inputted to the first transmission mechanism 30A via the first clutch 40A. The input shaft 31 of the second transmission mechanism 30B is connected to the driven member 42 of the second clutch 40B, and torque is inputted to the second transmission mechanism 30B via the second clutch 40B. The two transmission mechanisms 30A, 30B share the output shaft 32. In this way, the motorcycle 1 includes two paths as torque transmission paths extending from the crank shaft 21 of the engine 20 to the output shaft 32 of the transmission 30. That is, a first path is defined by the first transmission mechanism 30A and the first clutch 40A, and a second path is defined by the second transmission mechanism 30B and the second clutch 40B. The output shaft 32 of the transmission 30 is connected to the wheel shaft of the rear wheel 3 via the torque transmission member defined by a chain, belt, and shaft.

The first transmission mechanism 30A and the second transmission mechanism 30B include plural gears $1i$ to $6i$ and $1h$ to $6h$. The gears $1i$ to $6i$ are provided on the input shaft 31, and the gears $1h$ to $6h$ are provided on the output shaft 32. The gear $1i$ and the gear $1h$ are meshed with each other and the gear ratio thereof corresponds to a first speed. Similarly, the gears $2i$ to $6i$ and the gears $2h$ to $6h$ are meshed with each other and the gear ratios thereof correspond to second to sixth speeds. In this example, the first transmission mechanism 30A includes the gears $1i$, $3i$, $5i$, $1h$, $3h$, $5h$ corresponding to odd-number gear levels, and the second transmission mechanism 30B includes the gears $2i$, $4i$, $6i$, $2h$, $4h$, $6h$ corresponding to even-number gear levels.

The transmission mechanisms 30A, 30B are so-called selective slide-type transmission mechanisms. Of paired gears (for example, gear $1i$ and gear $1h$) corresponding to each gear level, one gear is relatively rotatable with respect to the shaft on which the gear is provided. However, the other gear is meshed in a spline with the shaft on which the other gear is provided, and the other gear rotates integrally with the shaft. In this example, the gears $1h$, $5i$, $3h$, $4h$, $6i$, $2h$ are relatively rotatable with respect to the shafts on which these gears are provided. Meanwhile, the gears $1i$, $5h$, $3i$, $4i$, $6h$, $2i$ are meshed with the shafts on which these gears are provided, and the gears rotate constantly integrally with the shafts. Therefore, in a neutral state (a state of not being set to any of gear levels), paired gears ($5i$, $5h$) and ($6i$, $6h$) rotate together with the output shaft 32 and paired gears ($1i$, $1h$), ($3i$, $3h$), ($4i$, $4h$) and ($2i$, $2h$) rotate together with the input shaft 31.

The gear rotating together with the input shaft 31 and the gear rotating together with the output shaft 32 are arranged next to each other in the axial direction and are relatively movable in the axial direction (that is, movable toward and away from each other). Also, the plural gears $1i$ to $6i$ and $1h$ to $6h$ include a gear provided with a dog clutch. The gear constantly rotating together with the input shaft 31 and the gear constantly rotating together with the output shaft 32 are engaged with each other by the dog clutch. By the engagement of these two gears, the rotation (torque) of the input shaft 31 of the first transmission mechanism 30A or the input shaft 31 of the second transmission mechanism 30B is transmitted to the output shaft 32. In the example of FIG. 2, the gears $5h$, $3i$, $4i$, $6h$ are movable in the axial direction.

As shown in FIG. 2, the transmission 30 is provided with a shift actuator 39 which moves, in the axial direction, the gears $5h$, $3i$, $4i$, $6h$ (movable gears) that are movable in the axial direction. The shift actuator 39 includes plural shift forks $39a$ which are caught on the movable gears, a shift cam $39b$ which rotates to move the shift forks $39a$ in the axial direction, and an electric motor $39c$ which generates power to rotate the shift cam $39b$, and the like. At the time of gear shift, the control device 10 drives the shift actuator 39 (that is, supplies the shift actuator 39 with its drive power). The control device 10 drives the shift actuator 39 to selectively move the plural movable gears, and thus switches gear levels.

The clutches 40A, 40B are provided with clutch actuators 49A, 49B, respectively. The clutch actuators 49A, 49B include, for example, an electric motor. The power of the electric motor is transmitted to one of the drive member 41 and the driven member 42 of the clutches 40A, 40B via hydraulic pressure or a rod and presses the drive member 41 and the driven member 42 to each other or separates the members from each other. At the time of gear shift, the control device 10 drives the clutch actuators 49A, 49B to put the clutches 40A, 40B in an engaged state or a released state (disengaged state).

As shown in FIG. 3, the engine 20 is provided with a fuel injector 22, a throttle actuator 23, and an ignition plug 24. The fuel injector 22 supplies the engine 20 with a fuel to be combusted in a combustion chamber of the engine 20. The throttle actuator 23 controls the degree of opening of a throttle valve (not shown) which adjusts the amount of air flowing through an intake channel of the engine 20. The ignition plug 24 ignites the gas mixture of air and fuel flowing into the combustion chamber of the engine 20. The amount of fuel injected by the fuel injector 22, the ignition timing by the ignition plug 24, and the degree of opening of the throttle valve (hereinafter, throttle opening) are controlled by the control device 10.

The motorcycle 1 includes an engine rotation speed sensor $19a$, a gear position sensor $19b$, clutch sensors $19c$, $19d$, an output-side rotation sensor $19e$, a shift switch $19f$, and accelerator sensor $19g$. These sensors are connected to the control device 10.

The engine rotation speed sensor $19a$ preferably includes a rotation sensor which outputs a pulse signal with a frequency corresponding to the rotation speed of the engine. The control device 10 calculates the rotation speed of the engine (rotation speed of the crank shaft 21) based on the output signal from the engine rotation speed sensor $19a$.

The gear position sensor $19b$ includes, for example, a potentiometer which outputs a voltage signal corresponding to the rotation angle of the shift cam $39b$. The control device 10 detects the position of the movable gears $5h$, $3i$, $4i$, $6h$ and the current gear level or the like, based on the output signal from the gear position sensor $19b$.

The output-side rotation sensor $19e$ is provided on the wheel shaft of the rear wheel 3 or the output shaft 32. The output-side rotation sensor $19e$ is, for example, a rotation sensor which outputs a pulse signal with a frequency corresponding to the rotation speed of the rear wheel 3 or the rotation speed of the output shaft 32. The control device 10 calculates the vehicle speed or the rotation speed of the output shaft 32 based on the output signal from the output-side rotation sensor $19e$.

The shift switch $19f$ is a switch operated by the rider and inputs a gear shift command by the rider (a signal indicating a shift-up command to raise the gear level or a signal indicating a shift-down command to lower the gear level) to the control device 10. Also, the shift switch $19f$ is provided with a shift-up switch and a shift-down switch.

The accelerator sensor $19g$ outputs a signal corresponding to the amount of operation (rotational angle) of an accelerator grip (not shown) provided on the steering 6. The accelerator sensor $19g$ includes, for example, a potentiometer. The control device 10 detects the amount of operation of the accelerator grip (amount of accelerator operation) based on the output signal from the accelerator sensor $19g$.

The clutch sensor $19c$ is arranged to detect the transmitted torque capacity of the first clutch 40A (that is, maximum torque that is transmitted in the current state (current degree of engagement) of the first clutch 40A). Meanwhile, the clutch sensor $19d$ is arranged to detect the transmitted torque capacity of the second clutch 40B (maximum torque that is transmitted in the current state (current degree of engagement) of the second clutch 40B). The transmitted torque capacity is a maximum (hereinafter referred to as maximum torque capacity) when the clutches 40A, 40B are in an engaged state. The transmitted torque capacity is at a minimum value (for example, 0 Nm) when the clutches 40A, 40B are in released state.

The transmitted torque capacity corresponds to the position of the clutches 40A, 40B (amount of clutch stroke). The clutch sensors $19c$, $19d$ are, for example, potentiometers which output a signal corresponding to the position of the clutches 40A, 40B (signal corresponding to the amount of operation of the clutch actuators 49A, 49B). The control device 10 detects the transmitted torque capacity from the clutch position detected based on the output signal from the clutch sensors $19c$, $19d$. For example, the control device 10 calculates the transmitted torque capacity from the detected clutch position, using a map that associates the clutch position with the transmitted torque capacity, or an arithmetic formula.

In the structure where the clutch actuators 49A, 49B actuate the clutches 40A, 40B by hydraulic pressure, the transmitted torque capacity corresponds to the hydraulic pressure (hereinafter, clutch pressure) acting on the clutches 40A, 40B. In such a structure, the clutch sensors $19c$, $19d$ may be hydraulic sensors which output a signal corresponding to the clutch pressure. In this case, the control device 10 detects the transmitted torque capacity based on the clutch pressure detected by the clutch sensors $19c$, $19d$. For example, the control device 10 calculates the transmitted torque capacity from the detected clutch pressure, using a map that associates the clutch pressure with the transmitted torque capacity, or an arithmetic formula.

Also, the transmitted torque capacity corresponds to a force acting on the clutches 40A, 40B from the clutch actuators 49A, 49B (pressing force acting between the drive member 41 and the driven member 42). The force acting on the clutches 40A, 40B from the clutch actuators 49A, 49B strains the portion receiving this force (for example, the cases of the clutches 40A, 40B or the like). Thus, the clutch sensors $19c$, $19d$ may be strain sensors which output a signal corresponding to the magnitude of the strain in the portion receiving the force from the clutches 40A, 40B. In such a case, the control device 10 detects the transmitted torque capacity based on the strain detected by the clutch sensors $19c$, $19d$. For example, the control device 10 calculates the transmitted torque capacity from the detected strain, using a map that associates the strain of the clutch with the transmitted torque capacity, or an arithmetic formula.

The control device 10 includes a CPU (central processing unit), a memory such as ROM (read only memory) and RAM (random access memory), and a drive circuit for the actuators 39, 49A, 49B, 23, the fuel injector 22 and the ignition plug 24. The control device 10 is arranged and programmed to drive the CPU to execute a program stored in the memory and thus controls the engine 20, the transmission 30 and the clutches 40A, 40B. Specifically, the control device 10 sets a target value for the output torque of the engine 20 (this target value is hereinafter referred to as a target engine torque Tetg). Then, the control device 10 drives the throttle actuator 23, the fuel injector 22 and the ignition plug 24, utilizing a map or arithmetic formula stored in the memory in advance, so that the actual output torque reaches the target engine torque Tetg. Also, the control device 10 sets a target value for the transmitted torque capacity of the first clutch 40A and the transmitted torque capacity of the second clutch 40B (this target value is hereinafter referred to as a target torque capacity). Then, the control device 10 drives the clutch actuators 49A, 49B (that is, supplies the clutch actuators 49A, 49B with their drive power) so that the actual transmitted torque capacity reaches the target torque capacity. Moreover, the control device 10 drives the shift actuator 39 (that is, supplies the shift actuator 39 with its drive power) so that the gear level set by the first transmission mechanism 30A and the second transmission mechanism 30B corresponds to the gear shift command.

The control device 10 is arranged and programmed to operate according to plural operation modes for transmission control. If the gear shift command is a shift-up command and the amount of accelerator operation is equal to or greater than a predetermined threshold value (if the accelerator grip is opened), the control device 10 executes power-on shift-up operation. Meanwhile, if the gear shift command is a shift-up command and the amount of accelerator operation is smaller than the predetermined threshold value (if the accelerator grip is closed), the control device 10 executes power-off shift-up operation. Moreover, if the gear shift command is a shift-down command and the amount of accelerator operation is equal to or greater than the predetermined threshold value, the control device 10 executes power-on shift-down operation. Meanwhile, if the gear shift command is a shift-down command and the amount of accelerator operation is smaller than the predetermined threshold value, the control device 10 executes power-off shift-down operation. These operation modes will be described later.

The outline of transmission control will be described. In normal travel (in a travel where no gear shift operation is carried out), the torque of the engine 20 is transmitted to the output shaft 32 via only one path of the two paths extending from the crank shaft 21 to the output shaft 32. That is, in normal travel, as described above, both the first clutch 40A and the second clutch 40B are set in an engaged state. Also, one transmission mechanism of the first transmission mechanism 30A and the second transmission mechanism 30B is set in a neutral state, and in the other transmission mechanism, the paired gears corresponding to the current gear level are engaged by a dog clutch. Therefore, the torque of the engine 20 is transmitted via only the path that includes the other transmission mechanism. In the following description, the clutch in the path (previous path) transmitting the torque before a gear shift operation is called a previous clutch. Also, the clutch in the path that does not transmit the torque before a gear shift operation (that is a path that transmits the torque after the gear shift operation, hereinafter referred to as a next path) is called a next clutch. Moreover, the transmission mechanism on the previous path is a previous transmission mechanism, and the transmission mechanism on the next path is a next transmission mechanism.

To facilitate understanding of advantages of the transmission control according to this preferred embodiment, the outline of the conventional transmission control will be described with reference to FIGS. 4A and 4B. In FIGS. 4A and 4B, the transmission mechanisms 30A, 30B and the clutches 40A, 40B shown in FIG. 2 are further simplified. In FIGS. 4A and 4B, Cp represents the previous clutch and Cn represents the next clutch. Also, Tp represents the previous transmission mechanism and Tn represents the next transmission mechanism. Moreover, a gear Gp1 of the previous transmission mechanism Tp is a gear constantly rotating together with the driven member 42 of the previous clutch Cp (in FIG. 2, the gear Gp1 is 1$i$, 1$h$, 3$i$, 3$h$, 4$i$, 4$h$, 2$i$ or 2$h$). A gear Gp2 of the previous transmission mechanism Tp is a gear that is engageable with the gear Gp1 by a dog clutch and is constantly rotating together with the output shaft 32 (in FIG. 2, the gear Gp2 is 5$h$, 5$i$, 6$h$ or 6$i$). One of the gear Gp1 and the gear Gp2 is a movable gear and the other gear is a fixed gear that does not move in the axial direction. Similarly, a gear Gn1 of the next transmission mechanism Tn is a gear constantly rotating together with the driven member 42 of the next clutch Cn (in FIG. 2, the gear Gn1 is 1$i$, 1$h$, 3$i$, 3$h$, 4$i$, 4$h$, 2$i$ or 2$h$). A gear Gn2 of the next transmission mechanism Tn is a gear that can be engaged with the gear Gn1 by a dog clutch and is constantly rotating together with the output shaft 32 (in FIG. 2, the gear Gn2 is 5$h$, 5$i$, 6$h$ or 6$i$). One of the gear Gn1 and the gear Gn2 is a movable gear and the other gear is a fixed gear. Hereinafter, the gears Gp1, Gp2 will be referred to as input-gears. Also, the gears Gn1, Gn2 will be referred to as output-gears. In these drawings, one input-gear Gp1, Gn1 and one output-gear Gp2, Gn2 are shown on each of the two transmission mechanisms Tp, Tn, for simplification. In FIGS. 4A and 4B, the gears Gp1, Gp2, Gn1, Gn2 are shown as gears on the output shaft 32. The output-gears Gp2, Gn2 are fixed to the output shaft 32 and rotate integrally with the output shaft 32. The input-gears Gp1, Gn1 shown in these drawings can freely relatively rotate with respect to the output shaft 32. The input-gears Gp1, Gn1 are meshed respectively with gears Gp3, Gn3 fixed to the input shaft 31 and rotate together with the driven members 42 of the clutches Cp, Cn via the gears Gp3, Gn3 and the input shaft 31. While the input-gears Gp1, Gn1 and the output-gears Gp2, Gn2 are provided on the output shaft 32 in this description, these gears Gp1, Gn1, Gp2, Gn2 may also be gears provided on the input shaft 31.

In normal travel, the conventional control device executes the following normal travel control. As shown in FIG. 4A(a), the control device sets the transmitted torque capacities of both the previous clutch Cp and the next clutch Cn to the maximum torque capacity, that is, sets the two clutches in an engaged state. Also, the previous transmission mechanism Tp is set in an engaged state where the input-gear Gp1 and the output-gear Gp2 are engaged with each other. The next transmission mechanism Tn is set in a neutral state where the input-gear Gn1 and the output-gear Gn2 are not engaged with each other. When a gear shift command is generated, the control device lowers the transmitted torque capacity of the next clutch Cn to the minimum value and completely disengages the next clutch Cn (FIG. 4A(b)). After the transmitted torque capacity of the next clutch Cn reaches the minimum value, the control device engages the input-gear Gn1 and the output-gear Gn2 of the next transmission mechanism Tn with each other (FIG. 4A(c)). After that, the control device lowers the transmitted torque capacity of the previous clutch Cp to the minimum value and raises the transmitted torque capacity of the next clutch Cn while disengaging the clutch Cp (FIG. 4B(d)). That is, the control device switches the clutch in an engaged state from the previous clutch Cn to the next clutch Cp. After that, the control device disengages the input-gear Gp1 and the output-gear Gp2 of the previous transmission mechanism Tp and finally returns the previous clutch Cn to engaged state again (FIG. 4B(e)).

In the normal travel control shown in FIG. 4A(a), the output-gear Gn2 of the next transmission mechanism Tn is fixed to the output shaft 32 and therefore rotates at a rotation speed corresponding to the gear ratio realized in the previous transmission mechanism Tp (gear ratio of the previous gear level) (that is, at an equal speed to the output-gear Gp2). The gear ratio realized by the gears Gp1, Gp3 of the previous transmission mechanism Tp and the gear ratio realized by the gears Gn1, Gn3 of the next transmission mechanism Tn are different from each other. Therefore, in the normal travel control, there is a difference in rotation speed between the input-gear Gn1 and the output-gear Gn2 of the next transmission mechanism Tn. Therefore, in FIG. 4A (c), at the moment when the input-gear Gn1 and the output-gear Gn2 become engaged with each other, the rotation speed of the gears Gn1, Gn3 and the driven member 42 changes suddenly. Consequently, a torque corresponding to the moment of inertia of the gears Gn1, Gn3 and the driven member 42 and the difference in rotation speed between the output-gear Gn2 and the input-gear Gn1 is generated (hereinafter, next gear-generated torque). The next gear-generated torque is transmitted to the rear wheel 3 via the output shaft 32 and generates a shock in gear shift operation. That is, if the torque being outputted by the engine 20 (hereinafter, actual engine torque) is Te, the primary gear ratio (gear ratio between the primary gear 41$a$ and the primary gear 21$a$) is R1, and the gear ratio realized by the previous transmission mechanism Tp is Rp, the next gear-generated torque+Te1 (Te1=Te×R1×Rp) becomes inputted to the output shaft 32. Also, at the time of shift-up, a positive torque to raise the rotation speed of the output shaft 32 is generated as the next gear-generated torque. At the time of shift-down, a negative torque to lower the rotation speed of the output shaft 32 is generated as the next gear-generated torque.

First Preferred Embodiment

Figure 5:
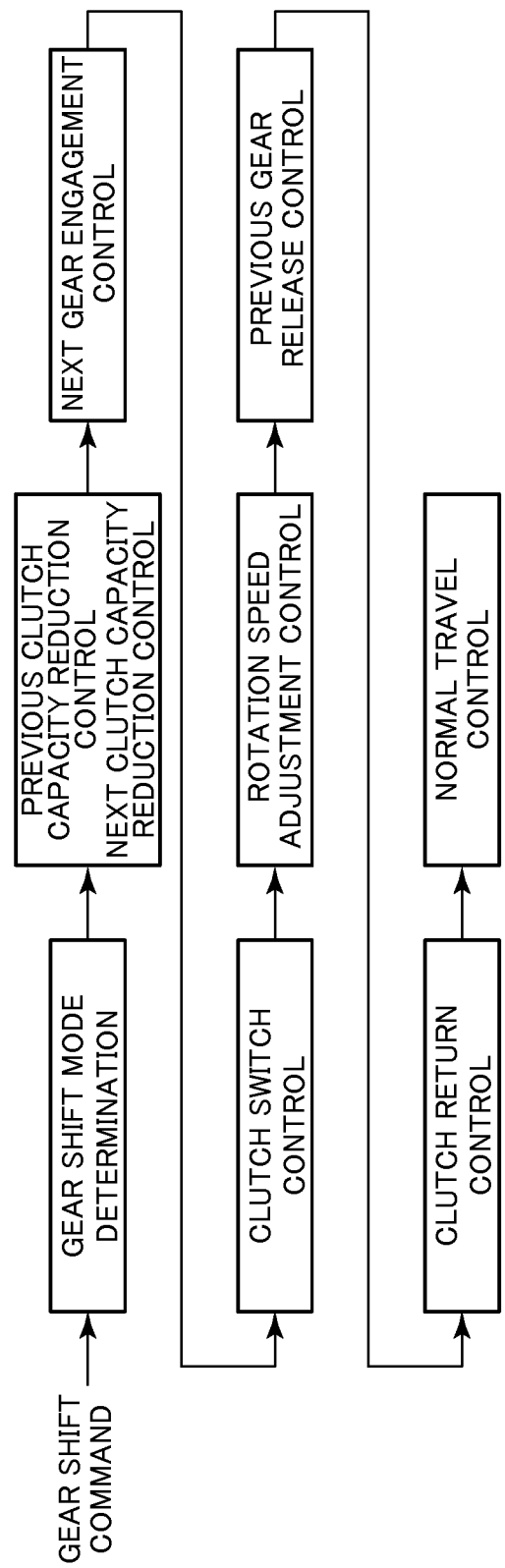
FIG. 5 is a view showing control and processing procedures executed by the control device.

In a first preferred embodiment of the present invention, in power-on shift-up operation, the control device 10 engages the input-gear Gn1 and the output-gear Gn2 with each other before the transmitted torque capacity of the next clutch Cn reaches the minimum value, that is, in the state where the transmitted torque capacity is higher than a transmitted torque capacity at the time when the next clutch is disengaged. Thus, the control device 10 can reduce the shock generated by the next gear-generated torque. FIG. 5 is a view showing control and processing procedures executed by the control device 10 in power-on shift-up.

As shown in FIG. 5, when a gear shift command is generated, the control device 10 first carries out operation mode determination. That is, the control device 10 decides an operation mode corresponding to the gear shift command, from among the above plural operation modes. As described above, the control device 10 decides the operation mode based on kind of the gear shift command (shift-down command/shift-up command) and the operating state of the vehicle (in this example, the amount of accelerator operation) when the gear shift command is generated. The gear shift command is inputted, for example, from the shift switch 19$f$ to the control device 10 in accordance with the rider's operation of the shift switch 19$f$. Also, the gear shift command may be generated by the control device 10 based on the operating state of the vehicle and the accelerator operation by the rider, with reference to a map that associates the vehicle speed and the rotation speed of the engine with the gear level, irrespective of the operation of the shift switch 19$f$.

FIGS. 6A and 6B are views for explaining the power-on shift-up operation. As shown in FIG. 6A (a), the control device 10 executes normal travel control similar to the control shown FIG. 4A (a). That is, the transmitted torque capacities of both the previous clutch Cp and the next clutch Cn are set to the maximum torque capacity, and the previous transmission mechanism Tp is set in an engaged state where the input-gear Gp1 and the output-gear Gp2 are engaged with each other. The next transmission mechanism Tn is set in a neutral state where the input-gear Gn1 and the output-gear Gn2 are not engaged with each other.

The control device 10 is arranged and programmed to execute the following controls in order in response to a gear shift command generated during the normal travel control. If, in the operation mode determination processing, the control device 10 determines that the mode corresponding to the gear shift command is the power-on shift-up operation, the control device executes next clutch capacity reduction control shown in FIG. 5 and FIG. 6A (b). The next clutch capacity reduction control lowers the transmitted torque capacity of the next clutch Cn from the maximum torque capacity, that is, shifts the next clutch Cn toward released state from engaged state. In the next clutch capacity reduction control, the control device 10 sets a target value for the transmitted torque capacity of the next clutch Cn (hereinafter, target torque capacity Cntg) to a higher value than the minimum value and drives the clutch actuators 49A, 49B so that the actual transmitted torque capacity approaches the target torque capacity Cntg.

In the example described here, the control device 10 executes previous clutch capacity reduction control together with the next clutch capacity reduction control, as shown in FIG. 5 and FIG. 6A (a). The previous clutch capacity reduction control is performed to lower the transmitted torque capacity of the previous clutch Cp from the maximum torque capacity, that is, to shift the previous clutch Cp toward released state from engaged state. In the previous clutch capacity reduction control, the control device 10 sets a target value for the transmitted torque capacity of the previous clutch Cp (hereinafter, target torque capacity Cptg) to a capacity corresponding to the actual engine torque Te. The capacity corresponding to the actual engine torque Te is a transmitted torque capacity that is necessary and sufficient to transmit the actual engine torque Te (that is, the capacity is equal to "Te×primary gear ratio R1"). The control device 10 drives the clutch actuators 49A, 49B so that the actual transmitted torque capacity approaches the target torque capacity Cptg). By executing the previous clutch capacity reduction control together with the next clutch capacity reduction control, and starting to reduce the transmitted torque capacity of the previous clutch Cp, the transmitted torque capacity of the previous clutch Cp can be set to the minimum value earlier and the time required for gear shift operation is significantly reduced. However, the previous clutch capacity reduction control need not necessarily be executed together with the next clutch capacity reduction control.

After starting the next clutch capacity reduction control, the control device 10 executes next gear engagement control shown in FIG. 5 and FIG. 6A(c). In the next gear engagement control, the control device 10 engages the input-gear Gn1 and the output-gear Gn2 of the next transmission mechanism Tn with each other in the state where the transmitted torque capacity of the next clutch Cn is higher than the value (that is, the minimum value) at the time when the next clutch Cn is disengaged. By doing so, the shock generated by the next gear-generated torque is significantly reduced or prevented. This occurs for the following reasons.

Until the input-gear Gn1 and the output-gear Gn2 are engaged with each other, the actual engine torque Te is entirely transmitted to the output shaft 32 through the previous clutch Cp and the previous transmission mechanism Tp, as shown in FIG. 6A(b). The torque Te1 inputted to the output shaft 32 from the engine 20 is the product of the actual engine torque Te, the primary gear ratio R1 and the gear ratio Rp of the previous transmission mechanism Tp (Te1=Te×R1×Rp), as described above. In this preferred embodiment, when the input-gear Gn1 and the output-gear Gn2 of the next transmission mechanism Tn are engaged with each other, the transmitted torque capacity of the next clutch Cn is a higher value than when the clutch Cn is disengaged. Therefore, at the moment when the engagement happens, the actual engine torque Te is distributed to the previous clutch Cp and the next clutch Cn to be transmitted to the output shaft 32. Referring to FIG. 6A(c), a part Tep of the actual engine torque Te is inputted to the output shaft 32 through the previous clutch Cp and the previous transmission mechanism Tp, and the remaining portion Ten of the actual engine torque Te is inputted to the output shaft 32 through the next clutch Cn and the next transmission mechanism Tn (Te=Tep+Ten). In shift-up operation, the gear ratio Rn between the input-gear Gn1 and the output-gear Gn2 is smaller than the gear ratio Rp realized by the previous transmission mechanism Tp. Therefore, the torque Te1 inputted to the output shaft 32 from the engine 20 falls to Te2 (te2<Te1) at the moment when the input-gear Gn1 and the output-gear Gn2 become engaged with each other. Consequently, the total torque Ttt1 inputted to the output shaft 32 falls, compared with the case shown in FIG. 4A(c), and thus the shock at the time when the next gear-generated torque is generated is significantly reduced (Ttt1=next gear-generated torque+Te2).

After the next gear engagement control of FIG. 6A(c), the control device 10 sequentially executes the following control. In the power-on shift-up operation, the control device 10 first executes clutch switch control shown in FIG. 5 and FIG. 6B(d). The clutch switch control is performed to shift the clutch transmitting the actual engine torque Te, from the previous clutch Cp to the next clutch Cn. Specifically, the control device 10 gradually raises the transmitted torque capacity of the next clutch Cn toward the capacity corresponding to the actual engine torque Te while gradually reducing the transmitted torque capacity of the previous clutch Cp toward the minimum value.

After the clutch switch control, the control device 10 executes rotation speed adjustment control shown in FIG. 5 and FIG. 6B (e) (so-called inertia phase). The rotation speed adjustment control is performed to equalize the rotation speed of the driven member 42 and the rotation speed of the drive member 41 of the next clutch Cn. That is, before the next gear engagement control shown in FIG. 6A (c), the rotation speed of the driven member 42 and the rotation speed of the drive member 41 of the next clutch Cn are roughly equal. However, at the moment when the input-gear Gn1 and the output-gear Gn2 are engaged with each other by the next gear engagement control, a difference in rotation speed between the driven member 42 and the drive member 41 is generated. In shift-up operation, the rotation speed of the driven member 42 becomes lower than the rotation speed of the drive member 41. The rotation speed adjustment control is performed to correct the difference in rotation speed. Specifically, the control device 10 reduces the actual engine torque Te and sets the transmitted torque capacity of the next clutch Cn to a higher value than the capacity corresponding to the actual engine torque Te. Thus, an inertial torque which gradually lowers the rotation speed of the engine is generated in the engine 20. Consequently, the rotation speed of the drive member 41 falls toward the rotation speed of the driven member 42 and the difference in rotation speed between the members is eliminated.

After the rotation speed adjustment control, the control device 10 executes previous gear release control to disengage the input-gear Gp1 and the output-gear Gp2 of the previous transmission mechanism Tp (FIG. 5 and FIG. 6B(f)). Also, the previous gear release control may be executed immediately when the transmitted torque capacity of the previous clutch Cp has reached the minimum value by the clutch switch control shown in FIG. 6B(d).

After the previous gear release control, the control device 10 executes clutch return control to return the transmitted torque capacity of the previous clutch Cp and the transmitted torque capacity of the next clutch Cn to the maximum torque capacity (FIG. 5 and FIG. 6B(f)). As the clutch return control ends, the gear shift operation is completed and normal travel control starts.

Figure 7:
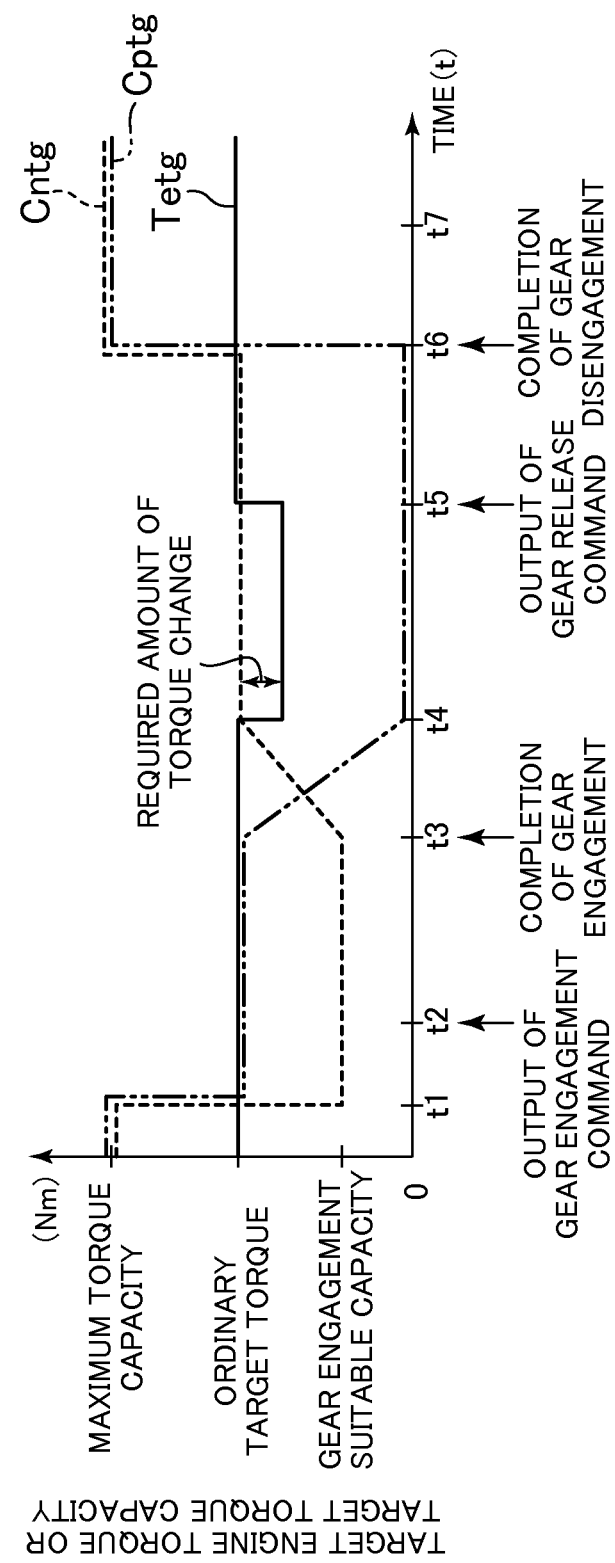
FIG. 7 is a time chart showing an example of change in target torque capacity and target engine torque in the case where the power-on shift-up operation according to the first preferred embodiment of the present invention is executed.

FIG. 7 is a time chart showing an example of change in the target torque capacities Cntg, Cptg and the target engine torque Tetg in the case where the above power-on shift-up operation is executed. In FIG. 7, the solid line shows an example of change in the target engine torque Tetg. The broken line shows an example of change in the target torque capacity Cntg of the next clutch Cn. The double-chain-dotted line shows an example of change in the target torque capacity Cptg of the previous clutch Cp. The target torque capacities Cntg, Cptg shown by the broken line and the double-chain-dotted line are converted to values obtained by dividing the target torque capacities by the primary gear ratio R1.

If a gear shift command is generated at t1 and the operation mode corresponding to the gear shift command is determined as a power-on shift-up operation, the control device 10 executes the above next clutch capacity reduction control. Specifically, the control device 10 sets the target torque capacity Cntg of the next clutch Cn to a higher value than the minimum value (that is, that enables transmission of the engine torque) (hereinafter this value is referred to a gear engagement suitable capacity CGn).

The gear engagement suitable capacity CGn is set based on the moment of inertia of the gears 1i, 3i, 4i, 2i, 1h, 3h, 4h, 2h rotating together with the driven member 42 and the driven member 42 of the clutches 40A, 40B. The moment of inertia of these members can be calculated at the stage of designing the engine 20. The gear engagement suitable capacity CGn may be, for example, a fixed value that is prescribed in advance. The gear engagement suitable capacity CGn may be, for example, a maximum value of the next gear-generated torque generated by every gear shift operation is set. Also, the gear engagement suitable capacity CGn may be, for example, an average value of next generation torque generated by every gear shift operation, or a slightly higher value than the average value may be used, for example. By thus using the fixed value that is prescribed in advance as the gear engagement suitable capacity CGn, the processing load on the CPU of the control device 10 is significantly reduced.

Depending on the gear level according to the gear shift command, there are gear shift operations in which the rider tends to feel a gear shift shock due to next gear-generated torque and gear shift operations in which the rider is less likely to feel a gear shift shock. Thus, the control device 10 may selectively set the gear engagement suitable capacity CGn corresponding to the gear level (next gear level or previous gear level) according to the gear shift command. That is, if a gear shift command which is more likely to make the rider feel a gear shift shock is generated, the control device 10 set the gear engagement suitable capacity CGn that is higher than the minimum value of the transmitted torque capacity as the target torque capacity Cntg. Meanwhile, if a gear shift command which is less likely to make the rider feel a gear shift shock is generated, the control device 10 may set the target torque capacity Cntg to the minimum value, instead of the gear engagement suitable capacity CGn.

Also, the next gear-generated torque depends on the difference in rotation speed between the gears Gn1, Gn2 before the gears Gn1, Gn2 are engaged. Therefore, the control device 10 may calculate the gear engagement suitable capacity CGn based on information related to the difference in rotation speed between the gears Gn1, Gn2. For example, the difference between the gear ratio realized by the next transmission mechanism Tn after a gear shift and the gear ratio realized by the transmission mechanism Tp before the gear shift is generally smaller as the next gear level is higher. Therefore, the difference in rotation speed between the gears Gn1, Gn2 is smaller as the next gear level is higher. Thus, the control device 10 may calculate the gear engagement suitable capacity CGn based on the gear level according to the gear shift command. For example, plural candidate values for the gear engagement suitable capacity CGn are associated with each gear level and thus stored in advance in the memory within the control device 10. Then, the control device 10 may select the gear engagement suitable capacity CGn corresponding to the gear shift command from among the plural candidate values, based on the gear level according to the gear shift command.

Also, the control device 10 may calculate the gear engagement suitable capacity CGn based on the difference in rotation speed between the gears Gn1, Gn2 or a value corresponding to the difference in rotation speed. Before the engagement of the gears Gn1, Gn2, the rotation speed of the output-gear Gn2 can be calculated, for example, based on the rotation speed of the engine and the gear ratio Rp of the previous transmission mechanism Tp, or based on the vehicle speed and the rotation speed of the output shaft 32. Meanwhile, the rotation speed of the input-gear Gn1 can be calculated based on the gear ratio Rn that is to be realized by the next transmission mechanism Tn (in the example of FIG. 6, the gear ratio between the gear Gn1 and the gear Gn3) and the rotation speed of the engine.

Also, if the moment of inertia of the driven member 42 of the clutch 40A and the gear rotating together with the driven member 42 is different from the moment of inertia of the driven member 42 of the clutch 40B and the gear rotating together with the driven member 42, two gear engagement suitable capacities CGn may be prescribed in advance. Then, the control device 10 may select one of the gear engagement correct capacities CGn according to which of the two clutches 40A, 40B is the next clutch Cn.

If a gear shift command is generated at t1, the control device 10 in this example executes the previous clutch capacity reduction control together with the next clutch capacity reduction control. Specifically, the control device 10 sets the target torque capacity Cptg of the previous clutch Cp to a capacity corresponding to the actual engine torque Te. That is, the control device 10 sets the target torque capacity Cptg to a transmitted torque capacity that is necessary and sufficient to transmit the actual engine torque.

The control device 10 controls the engine 20 so that the actual engine torque Te coincides with a target engine torque Tetg. In a period except the rotation speed adjustment control (in FIG. 7, t4 to t5), the target engine torque Tetg is set to an ordinary target torque obtained by predetermined processing. Therefore, in the example shown in FIG. 7, the target torque capacity Cptg is lowered to a capacity corresponding to the ordinary target torque (the capacity is equal to "ordinary target torque×primary gear ratio T1"). The ordinary target torque is the target engine torque Tetg set in normal engine control (the normal engine control is an engine control carried out except the rotation speed adjustment control). The ordinary target torque is, for example, a torque corresponding to the amount of accelerator operation. The control device 10 calculates the ordinary target torque according to the amount of accelerator operation detected by the accelerator sensor 19g and the rotation speed of the engine detected by the engine rotation speed sensor 19a. For example, the control device 10 calculates the ordinary target torque, using a map which associates the amount of accelerator operation, the rotation speed of the engine and the engine torque with each other and is stored in the memory in advance.

The control device 10 outputs a gear engagement command to engage the gears Gn1 and Gn2 with each other so that the gears Gn1, Gn2 of the next transmission mechanism Tn are engaged after the actual transmitted torque capacity of the next clutch Cn coincides with the gear engagement suitable capacity CGn. In the example shown in FIG. 7, the control device 10 outputs a gear engagement command when the actual transmitted torque capacity of the next clutch Cn coincides with the gear engagement suitable capacity CGn and the actual transmitted torque capacity of the previous clutch Cp coincides with the capacity corresponding to the actual engine torque Te (t2). Then, the shift actuator 39 begins to operate and the movable gear of the gears Gn1, Gn2 starts to move toward the fixed gear. After that, in the example of FIG. 7, the engagement of the gears Gn1, Gn2 is completed at t3.

Also, the control device 10 may output the gear engagement command before the transmitted torque capacity of the next clutch Cn reaches the gear engagement suitable capacity CGn. That is, as shown in FIG. 7, there is a time difference due to the drive speed of the shift actuator 39 between the output of the gear engagement command (t2) and the completion of the engagement between the gears Gn1, Gn2 (t3). Therefore, the control device 10 may output the gear engagement command at an earlier time point than the time point when the transmitted torque capacity reaches the gear engagement suitable capacity CGn so that the gears Gn1, Gn2 are engaged after the transmitted torque capacity of the next clutch Cn reaches the gear engagement suitable capacity CGn. Thus, the time required for a gear shift is significantly reduced. Such processing is carried out, for example, as follows. The control device 10 outputs the gear engagement command when a predetermined time (hereinafter, a command output delay time) has passed since the time point when the target torque capacity Cntg of the next clutch Cn is set to the gear engagement suitable capacity CGn (in FIG. 7, t1). This command output delay time is preset according to the drive speed of the shift actuator 39. That is, the command output delay time is predetermined in consideration of the drive speed of the shift actuator 39 so that the gears Gn1, Gn2 are engaged after the transmitted torque capacity of the next clutch Cn reaches the gear engagement suitable capacity CGn.

When the completion of the engagement between the gears Gn1, Gn2 is detected at t3, the control device 10 starts the clutch switch control. That is, the control device 10 gradually raises the target torque capacity Cntg of the next clutch Cn toward the capacity corresponding to the actual engine torque Te from the gear engagement suitable capacity CGn. At the same time, the control device 10 gradually lowers the target torque capacity Cptg of the previous clutch Cp toward the minimum value from the capacity corresponding to the actual engine torque Te. Consequently, in the example of FIG. 7, at t4, the target torque capacity Cntg reaches the capacity corresponding to the actual engine torque Te and the target torque capacity Cptg reaches the minimum value. The clutches Cn, Cp are controlled to follow their respective target torque capacities. In FIG. 7, at t4, the actual transmitted torque capacities, too, reach the capacity corresponding to the actual engine torque Te and the minimum value, respectively. The clutch switch control is thus completed.

In this preferred embodiment, in the clutch switch control, the target torque capacity Cntg of the next clutch Cn rises toward the capacity corresponding to the actual engine torque Te from the gear engagement suitable capacity CGn. Therefore, the time required for a gear shift is significantly reduced, compared with the case where the target torque capacity Cntg is raised to the capacity corresponding to the actual engine torque Te from the minimum value in the clutch switch control after the target torque capacity Cntg of the next clutch Cn is temporarily set to the minimum value.

When the clutch switch control is completed, the control device 10 starts the rotation speed adjustment control (t4). That is, the control device 10 sets a lower value than the ordinary target torque as the target engine torque Tetg. Specifically, the control device 10 sets a value that is lower than the ordinary target torque by a required amount of torque change, as the target engine torque Tetg. The required amount of torque change will be described later. The control device 10 lowers the target engine torque Tetg from the ordinary target torque and at the same time sets the target torque capacity Cntg of the next clutch Cn to the capacity corresponding to the ordinary target torque. Also, the control device 10 sets the target torque capacity Cptg of the previous clutch Cp to the minimum value. Thus, an inertial torque corresponding to a required torque capacity is generated in the engine 20 and the rotation speed of the engine gradually falls. Consequently, at t5, the rotation speed of the drive member 41 of the next clutch Cn coincides with the rotation speed of the driven member 42, and then the control device 10 ends the rotation speed adjustment control. That is, the control device 10 returns the target engine torque Tetg to the ordinary target torque. Also, the control device 10 sets target torque capacity Cntg of the next clutch Cn to the capacity corresponding to the actual engine torque Te. In the example of FIG. 7, since the actual engine torque Te coincides with the ordinary target torque that is the target engine torque Tetg, the control device 10 sets the target torque capacity Cntg to the capacity corresponding to the ordinary target torque.

When the rotation speed adjustment control ends at t5, the control device 10 outputs a gear release command to disengage the input-gear Gp1 and the output-gear Gp2 of the previous clutch Cp from each other. Consequently, at t6, Gp1 and Gp2 are disengaged from each other. When the disengagement of the gears Gp1, Gp2 is detected, the control device 10 executes the clutch return control. That is, the control device 10 sets both the target torque capacity Cntg and the target torque capacity Cptg to the maximum torque capacity. When the actual transmitted torque capacities reach the maximum torque capacity at t7, the gear shift is completed and the control device 10 starts the normal travel control.

Figure 8:
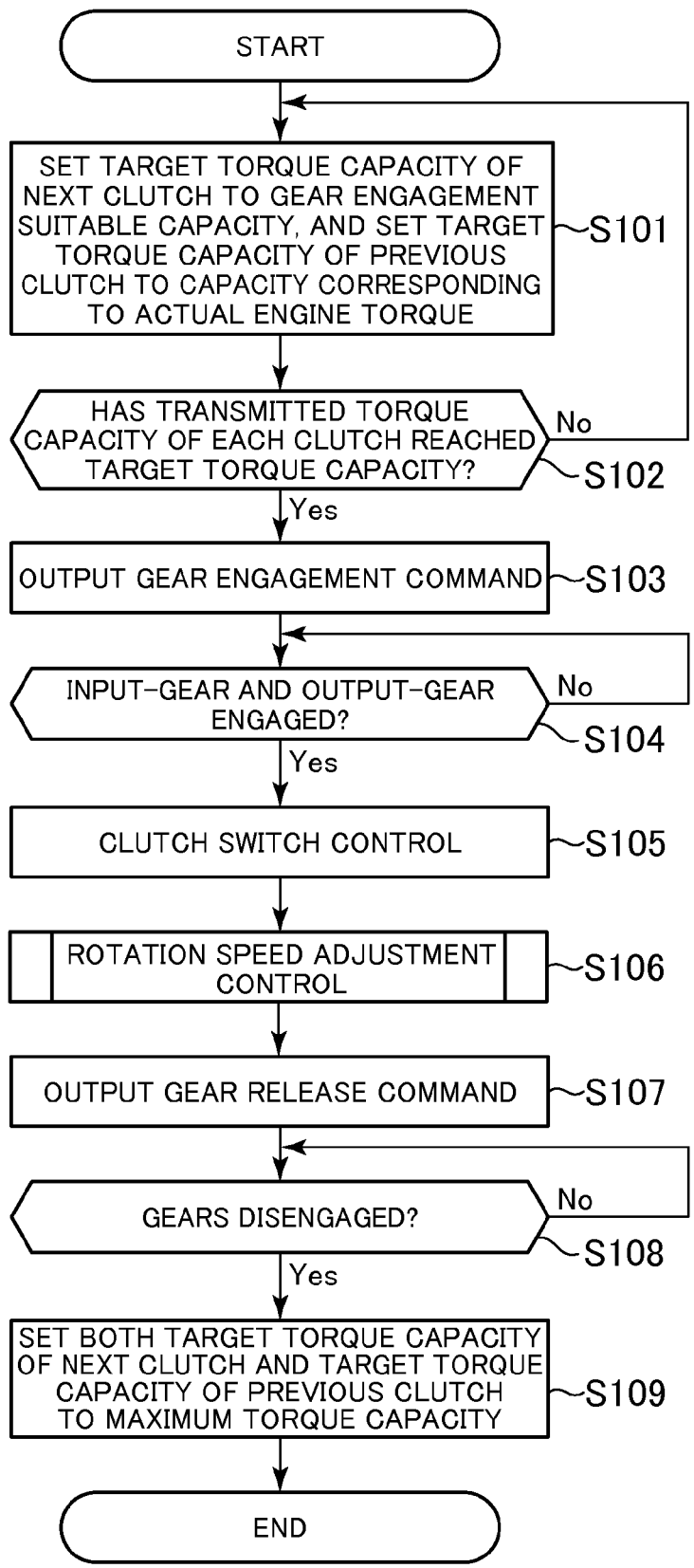
FIG. 8 is a flowchart showing an example of processing executed by the control device in the power-on shift-up operation.

A flow of processing executed by the control device 10 will be described. FIG. 8 is a flowchart showing an example of the processing executed by the control device 10. Here, the case where the operation mode corresponding to the gear shift command is determined as the power-on shift-up operation by the operation mode determination processing is described as an example.

The control device 10 executes the above next clutch capacity reduction control and previous clutch capacity reduction control, in response to a gear shift command generated during the normal travel control. Specifically, the control device 10 sets the target torque capacity Cntg of the next clutch Cn to the gear engagement suitable capacity CGn (S101). Also, the control device 10 sets the target torque capacity Cptg of the previous clutch Cp to the capacity corresponding to the actual engine torque Te (S101). The actual engine torque Te can be calculated with reference to a map stored in the memory in advance, based on the throttle opening and the rotation speed of the engine.

Next, the control device 10 determines whether or not the transmitted torque capacities of the clutches Cn, Cp detected by the clutch sensors 19c, 19d have reached the target torque capacities Cntg, Cptg, respectively, which are set in S101 (S102). The control device 10 repeats executing the processing of S101 and S102 until the transmitted torque capacities of the clutches Cn, Cp reach the target torque capacities Cntg, Cptg.

When the transmitted torque capacities of the clutches Cn, Cp have reached the target torque capacities Cntg, Cptg, the control device 10 outputs a gear engagement command to the shift actuator 39 (S103).

Next, the control device 10 determines whether the gears Gn1, Gn2 are engaged with each other or not (S104). For example, the control device 10 detects the position of the movable gear of the gears Gn1, Gn2 by the gear position sensor 19b, and determines whether or not the position of the movable gear has reached an engagement position to be engaged with the fixed gear. Also, the control device 10 may determine whether the input-gear Gn1 is engaged with the output-gear Gn2 or not, using a change in the rotation speed of the input shaft 31 of the next transmission mechanism Tn. For example, the control device 10 may determine whether or not the difference (Sout×R−Stn) between the rotation speed (Sout×Rn) of the input shaft 31 that is decided according to the rotation speed (Sout) of the rear wheel 3 or the output shaft 32 and the gear ratio Rn of the next gear level, and the rotation speed (Stn) of the input shaft 31 of the next transmission mechanism. Tn, is smaller than a threshold value. Then, the control device 10 may determine that the two gears Gn1, Gn2 are engaged with each other when the difference is smaller than the threshold value.

After the input-gear Gn1 and the output-gear Gn2 are engaged with each other, the control device 10 executes the clutch switch control described with reference to FIG. 6B (d) (S105). Specifically, as described above, the control device 10 gradually raises the target torque capacity Cntg of the next clutch Cn toward the capacity corresponding to the actual engine torque Te. Also, at the same time, the control device 10 gradually lowers the target torque capacity Cptg of the previous clutch Cp toward the minimum value. When the transmitted torque capacities of the clutches Cn, Cp detected by the clutch sensors 19c, 19d coincide with the capacity corresponding to the actual engine torque Te and the minimum value, respectively, the control device 10 determines that the clutch switch control is completed. After that, the control device 10 executes the rotation speed adjustment control (S106). Specific processing executed by the control device 10 in the rotation speed adjustment control will be described later.

After the rotation speed adjustment control ends, the control device 10 executes the previous gear release control. Specifically, the control device 10 outputs a gear release command to disengage the gears Gp1 and Gp2 of the previous transmission mechanism Tp, to the shift actuator 39 (S107). After that, the control device 10 determines whether the gears Gp1, Gp2 are disengaged or not (S108). For example, the control device 10 determines whether the movable gear of the two gears Gp1, Gp2 is at a neutral position or not, based on an output signal from the gear position sensor 19b. When the movable gear Gp1 has reached the neutral position, the control device 10 determines that the gears Gp1, Gp2 are disengaged.

Finally, the control device 10 executes the clutch return control. Specifically, the control device 10 sets the target torque capacity Cptg of the previous clutch Cp and the target torque capacity Cntg of the next clutch Cn to the maximum torque capacity (S109). As the transmitted torque capacities of the clutches Cp, Cn reach the maximum torque capacity as a result of S109, the gear shift is completed and the control device 10 ends the power-on shift-up operation of this time.

The processing executed by the control device 10 in the rotation speed adjustment control will be described. As described above, the rotation speed adjustment control is performed to correct the difference between the rotation speed of the drive member 41 and the rotation speed of the driven member 42 of the next clutch Cn. The control device 10 changes the rotation speed of the engine toward a next gear level-compatible speed and thus eliminates the difference in rotation speed. The next gear level-compatible speed is a rotation speed of the engine corresponding to the vehicle speed or the rotation speed of the output shaft 32 and the gear ratio Rn of the next gear level. The next gear level-compatible speed is, for example, vehicle speed×primary gear ratio R1×Rn. As the rotation speed of the engine approaches the next gear level-compatible speed, the rotation speed of the drive member 41 of the next clutch Cn approaches the rotation speed of the driven member 42. In the power-on shift-up operation, the control device 10 reduces the actual engine torque Te and thus lowers the rotation speed of the engine toward the next gear level-compatible speed. Meanwhile, in other operation modes (for example, power-on shift-down operation, described later), the control device 10 increases actual engine torque Te and thus raises the rotation speed of the engine toward the next gear level-compatible speed.

Figure 9:
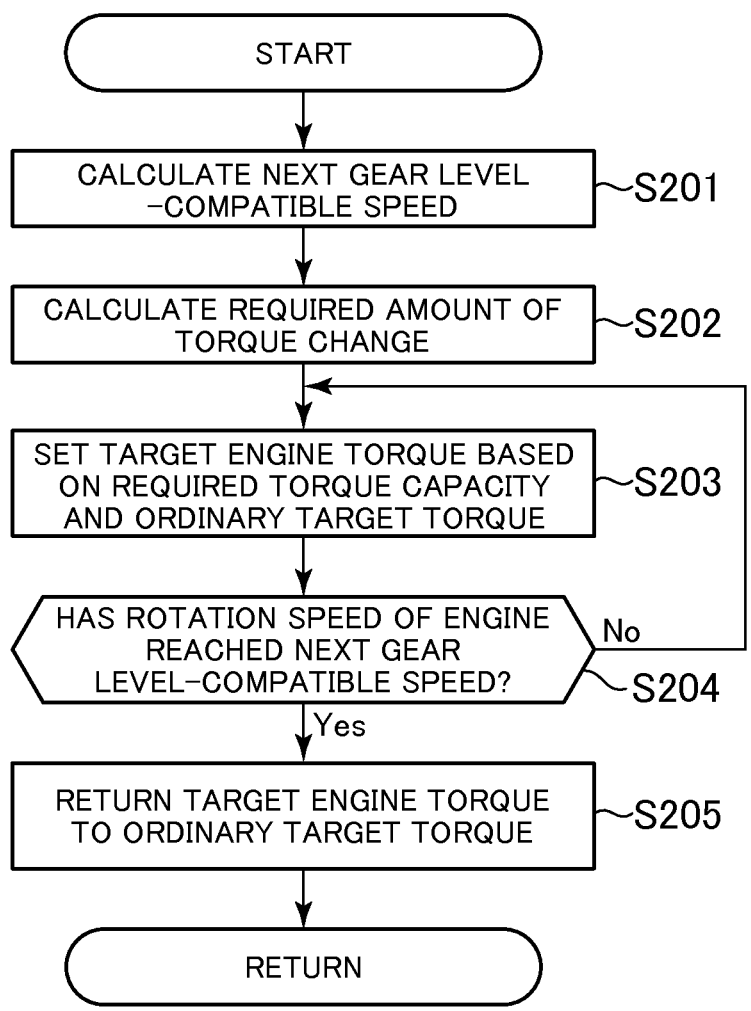
FIG. 9 is a flowchart showing an example of processing executed in rotation speed adjustment control.

FIG. 9 is a flowchart showing an example of processing executed in the rotation speed adjustment control.

The control device 10 calculates the next gear level-compatible speed (S201). Next, the control device 10 calculates a required amount of torque change (S202). The required amount of torque change is a torque that is necessary to raise or lower the rotation speed of the engine toward the next gear level-compatible speed. In the example described here, the required amount of torque change is the inertial torque of the engine 20 generated when raising or lowering the rotation speed of the engine to the next gear level-compatible speed. The required amount of torque change is calculated based on the actual rotation speed of the engine when the rotation speed adjustment control is started, the next gear level-compatible speed, and the time period during which the rotation speed of the engine is changed (hereinafter, adjustment control time). The control device 10 calculates the required amount of torque change, for example, using the following arithmetic formula.

$$\text{Required amount of torque change} = I \times (Se - Stg)/\Delta t$$

I: Moment of inertia of the engine 20 around the crank shaft 21
Se: Rotation speed of the engine
Stg: Next gear level-compatible speed
Δt: Adjustment control time The moment of inertia can be calculated, for example, at the stage of designing the engine 20.

The adjustment control time is calculated, for example, with reference to a map stored in the control device 10 (hereinafter, adjustment time map). For example, in the adjustment time map, the adjustment control time is associated with the gear level (previous gear level and next gear level) according to the gear shift command and the amount of accelerator operation. For example, when the amount of accelerator operation increases, the adjustment control time becomes shorter. The control device 10 calculates the adjustment control time based on the gear level according to the gear shift command and the amount of accelerator operation detected by the accelerator sensor 19g.

In the rotation speed adjustment control, the control device 10 sets the target engine torque Tetg based on the required torque capacity and the ordinary target torque (S203). Specifically, the control device 10 sets the torque obtained by subtracting the required amount of torque change from the ordinary target torque, as the target engine torque Tetg (Tetg=T0−Ti, where T0 is the ordinary target torque and Ti is the required amount of torque change). Thus, at the time of shift-up operation, the actual engine torque Te falls by the required amount of torque change, and the rotation speed of the engine falls.

Also, during the rotation speed adjustment control, the previous clutch Cp is in released state, as described with reference to FIG. 7. That is, the transmitted torque capacity of the previous clutch Cp is set to the minimum value. Also, the transmitted torque capacity of the next clutch Cn is set to a higher value than the actual engine torque Te. Specifically, the control device 10 sets the target torque capacity Cntg of the next clutch Cn to a capacity corresponding to the ordinary target torque, simultaneously with S203.

After S203, the control device 10 determines whether the rotation speed of the engine has reached the next gear level-compatible speed or not (S204). The control device 10 continues the processing of S203 until the rotation speed of the engine reaches the next gear level-compatible speed. As the rotation speed of the engine reaches the next gear level-compatible speed, the control device 10 returns the target engine torque Tetg to the ordinary target torque (S205). Then, the rotation speed adjustment control ends and the control device 10 returns to the processing of S107 of FIG. 8.

The next gear engagement control in which the gears Gn1, Gn2 of the next transmission mechanism. Tn are engaged with each other in the state where the transmitted torque capacity of the next clutch Cn is higher than the minimum value may also be executed in the power-off shift-down operation. By executing the next gear engagement control in the power-off shift-down operation, too, a gear shift shock generated by the next gear-generated torque is significantly reduced. That is, when power is off, a negative actual engine torque Te is transmitted from the engine 20 to the output shaft 32. At the time of shift-down operation, a negative next gear-generated torque is generated at the moment when the gears Gn1, Gn2 are engaged. That is, the next gear-generated torque and the actual engine torque Te in the power-off shift-down operation do not differ from those in the power-on shift-up operation, except that these torques have negative values. Therefore, by executing the above next gear engagement control in the power-off shift-down operation, the absolute value of the torque (in FIG. 6A(b), Te2) inputted to the output shaft 32 from the engine 20 is reduced at the moment when the gears Gn1, Gn2 are engaged. The reduction in the absolute value of the torque compensates for the next gear-generated torque and reduces a gear shift shock generated by the next gear-generated torque.

Second Preferred Embodiment

In a second preferred embodiment of the present invention, as in the first preferred embodiment, the control device 10 executes the previous clutch capacity reduction control to lower the transmitted torque capacity of the previous clutch Cp and the next clutch capacity reduction control to lower the transmitted torque capacity of the next clutch Cn, in response to a gear shift command generated during the normal travel control. After starting the next clutch capacity reduction control and the previous clutch capacity reduction control, the control device 10 engages the gears Gn1, Gn2 of the next transmission mechanism Tn with each other, by the next gear engagement control.

Unlike the first preferred embodiment, the control device 10 according to the second preferred embodiment engages the gears Gn1, Gn2 of the next transmission mechanism Tn with each other in the state where the transmitted torque capacity of the previous clutch Cp is higher than a capacity corresponding to the actual engine torque Te. More specifically, in the previous clutch capacity reduction control, the control device 10 sets the target torque capacity Cptg of the previous clutch Cp to a higher value than the capacity corresponding to the actual engine torque Te (this value is referred to as a gear engagement suitable capacity CGp). Then, the control device 10 engages the gears Gn1, Gn2 with each other in the state where the transmitted torque capacity of the previous clutch Cp is the gear engagement suitable capacity CGp.

FIG. 10 is a view for explaining the outline of the control executed by the control device 10 in this preferred embodiment. FIG. 10(a) shows the state of the clutches Cn, Cp and the transmission mechanisms Tn, Tp in the normal travel control similar to FIG. 6A(a). As shown in FIG. 10(b), when a gear shift command is generated, the control device 10 executes the next clutch capacity reduction control to lower the transmitted torque capacity of the next clutch Cn to the minimum value, thus disengaging the next clutch Cn. Also, as shown in FIG. 10(b), the control device 10 executes the previous clutch capacity reduction control to lower the transmitted torque capacity of the previous clutch Cp. The control device 10 sets the transmitted torque capacity of the previous clutch Cp to the gear engagement suitable capacity CGp, which is higher than the capacity corresponding to the actual engine torque Te. After that, the control device 10 engages the input-gear Gp1 and the output-gear Gp2 of the next transmission mechanism Tn with each other, as shown in FIG. 10(c).

In the state shown in FIG. 10(a), there is no difference in rotation speed between the driven member 42 and the drive member 41 of the previous clutch Cp. When the gears Gn1, Gn2 are engaged as shown in FIG. 10(c), again, there is no difference in rotation speed between the drive member 41 and the driven member 42 of the previous clutch Cp because the transmitted torque capacity of the previous clutch Cp is higher than the capacity corresponding to the actual engine torque Te. In the state where there is no difference in rotation speed, the previous clutch Cp can transmit the torque in either direction of upstream and downstream of the previous clutch Cp. Particularly in this preferred embodiment, since the transmitted torque capacity of the previous clutch Cp is set higher value than the capacity corresponding to the actual engine torque Te, a sufficient transmitted torque capacity is secured in the previous clutch Cp when the gears Gn1, Gn2 are engaged, even if the actual engine torque Te is small. For example, even in the power-on shift-up operation where the target engine torque Tetg is low or the power-off shift-up operation where the next gear-generated torque is positive and the actual engine torque Te is negative, a sufficient transmitted torque capacity is secured in the previous clutch Cp. Consequently, a larger gear-generated torque than the actual engine torque Te is transmitted to the engine 20 through the previous clutch Cp, and a shock generated by the gear-generated torque is significantly reduced.

Referring to FIG. 10 in the description, in FIG. 10(b), the actual engine torque Te is transmitted to the output shaft 32 through the previous clutch Cp, and a torque Te1 is inputted to the output shaft 32 (Te1=Te×primary gear ratio R1×gear ratio Rp of the previous transmission mechanism Tp). In FIG. 10(c), when the gears Gn1, Gn2 are engaged, a next gear-generated torque is generated. If the next gear-generated torque is equivalent to the torque Te1, these torques offset each other and therefore a large torque change does not occur in the output shaft 32. However, if the actual engine torque Te is small, the next gear-generated torque is not offset by the torque Te1. In this preferred embodiment, the transmitted torque capacity of the previous clutch Cp is preferably set to a higher value than the capacity corresponding to the actual engine torque Te. Therefore, even if the actual engine torque Te is small, a torque Tg0 equivalent to the difference between the torque Te1 and the next gear-generated torque can be transmitted to the engine 20 through the previous clutch Cp. Specifically, a torque equivalent to the gear engagement suitable capacity CGp is transmitted to the engine 20 through the previous clutch Cp. Consequently, a shock generated by the gear-generated torque is significantly reduced. Also, the previous clutch capacity reduction control and the next gear engagement control according to the second preferred embodiment may be executed not only in the power-on shift-up operation but also in the other three operation modes, as will be described later.

Figure 11:
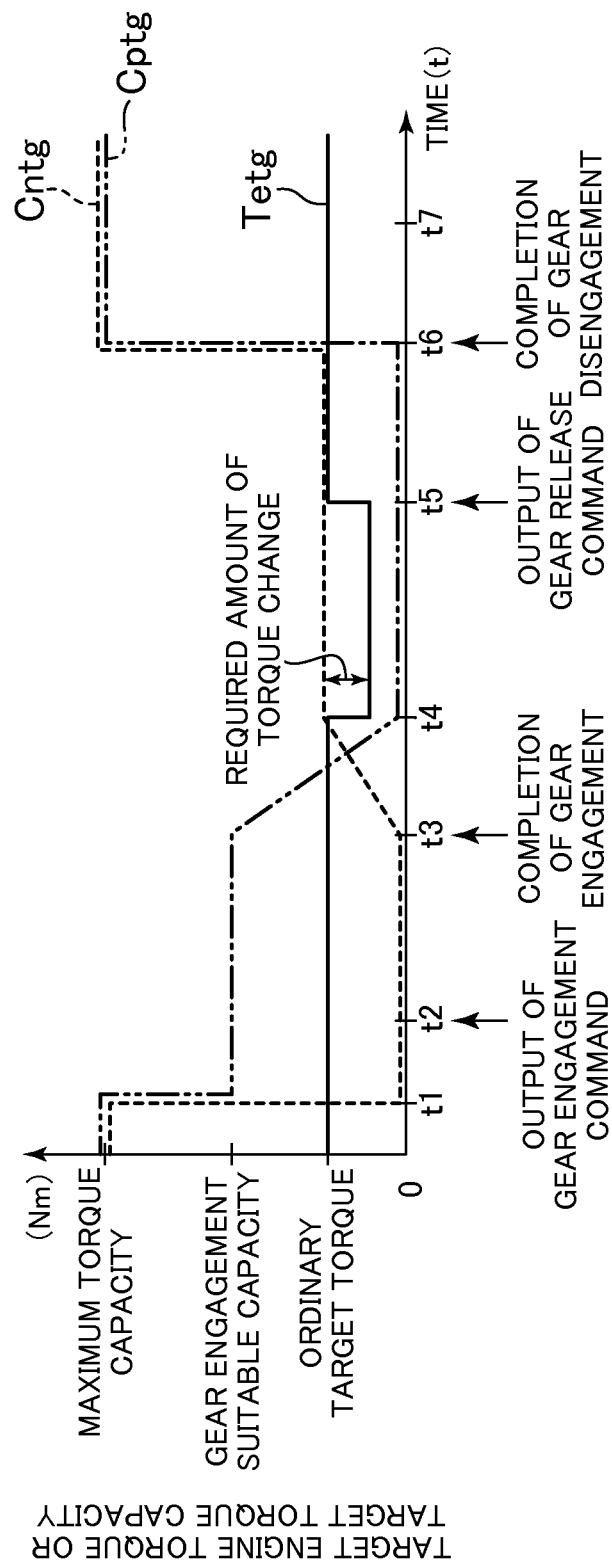
FIG. 11 is a time chart showing an example of change in target torque capacity and target engine torque in the case where power-on shift-up operation according to the second preferred embodiment of the present invention is executed.

FIG. 11 is a time chart showing an example of change in the target torque capacities Cntg, Cptg and the target engine torque Tetg in the case where the power-on shift-up operation according to the second preferred embodiment is executed. The values represented by individual lines in FIG. 11 are similar to FIG. 7.

If a gear shift command is generated at t1 and the operation mode corresponding to the gear shift command is the power-on shift-up operation, the control device 10 executes the next clutch capacity reduction control to set the target torque capacity Cntg of the next clutch Cn to the minimum value (in FIG. 11, 0 Nm). Also, the control device 10 executes the above previous clutch capacity reduction control to set the target torque capacity Cptg of the previous clutch Cp to the actual gear engagement suitable capacity CGp that is lower than the maximum torque capacity and higher than the capacity corresponding to the actual engine torque Te.

The gear engagement suitable capacity CGp is calculated according to the actual engine torque Te or the target engine torque Tetg. For example, the gear engagement suitable capacity CGp is the product of the actual engine torque Te or the target engine torque Tetg, the primary gear ratio R1, and a coefficient obtained by predetermined processing (hereinafter, this coefficient will be referred as a capacity coefficient k1, and CGp=Te×T1×k1 or CGp=Tetg×R1×k1, where k1≥1). Also, the gear engagement suitable capacity CGp may be the sum of the product of the actual engine torque Te or the target engine torque Tetg and the primary gear ratio R1 (that is, transmitted torque capacity corresponding to Te or Tetg), and a value obtained by a predetermined processing (hereinafter, this value is called an additional value C, and CGp=Te×R1+C or CGp=Tetg×R1+C, where C≥0). Moreover, the gear engagement suitable capacity CGp may be calculated using both the capacity coefficient k1 and the additional capacity C (CGp=Te×R1×k1+C or CGp=Tetg×R1×k1+C).

The capacity coefficient k1 and the additional capacity C are values that are set according to the moments of inertia of the gears $1i, 3i, 4i, 2i, 1h, 3h, 4h, 2h$ rotating together with the driven member 42 and the driven member 42 of the clutches 40A, 40B. The capacity coefficient k1 and the additional capacity C are, for example, fixed values that are preset according to these moments of inertia. The use of fixed values that are prescribed in advance as the capacity coefficient k1 and the additional capacity C can reduce the processing load on the CPU of the control device 10. The capacity coefficient k1 and the additional capacity C are stored in the memory provided in the control device 10, and the above-mentioned predetermined processing is processing in which the control device 10 reads out the capacity coefficient k1 and the additional capacity C from the memory.

Also, in calculating the gear engagement suitable capacity CGp, the control device 10 may selectively use the capacity coefficient k1 and/or the additional capacity C, depending on the gear level according to the gear shift command. That is, when a gear shift command designating a gear shift which tends to make the rider feel a gear shift shock is generated, the control device 10 calculates the gear engagement suitable capacity CGp, using the capacity coefficient k1 and/or the additional capacity C which are prescribed in advance. Meanwhile, if a gear shift command which is less likely to make the rider feel a gear shift shock is generated, the control device 10 may set the capacity corresponding to the actual engine torque Te as the gear engagement suitable capacity CGp.

The capacity coefficient k1 and the additional capacity C may also be calculated based on information about the difference in rotation speed between the input-gear Gn1 and the output-gear Gn2. For example, the control device 10 may calculate the capacity coefficient k1 and/or the additional capacity C based on the gear level according to the gear shift command. For example, plural candidate values for the capacity coefficient k1 or plural candidate values for the additional capacity C are associated with each gear level and thus stored in advance in the memory within the control device 10. Then, the control device 10 may select the capacity coefficient k1 and/or the additional capacity C corresponding to the gear shift command from among the plural candidate values, based on the gear level according to gearshift command. Also, if a gearshift command which is less likely to make the rider feel a gear shift shock is generated, 1 or 0, which is the minimum value, may be set as the capacity coefficient k1 and the additional capacity C.

Also, in the power-on shift-up operation executed in the state where the amount of accelerator operation is sufficiently large, the next gear-generated torque that can be offset by the torque Te1 inputted to the output shaft 32 from the engine 20 increases. Therefore, the capacity coefficient k1 and the additional capacity C may be calculated based on the amount of accelerator operation, the actual engine torque Te and the target engine torque Tetg. For example, as the amount of accelerator operation, the actual engine torque Te and the target engine torque Tetg increase, the capacity coefficient k1 and the additional capacity C may be made to approach their minimum values. Also, if the amount of accelerator operation, the actual engine torque Te and the target engine torque Tetg are greater than a threshold value, the minimum value may be set as the capacity coefficient k1 and the additional capacity C. Also, the control device 10 may calculate the capacity coefficient k1 and/or the additional capacity C based on the difference in rotation speed between the gear Gn1 and the gear Gn2 or a value corresponding to the difference in rotation speed.

Moreover, if the moment of inertia of the driven member 42 of the clutch 40A and the gear rotating together with the member and the moment of inertia of the driven member 42 of the clutch 40B and the gear rotating together with the member are different from each other, two capacity coefficients k1 and/or two additional capacities C may be prescribed in advance. Then, the control device 10 may select one of the two values, according to which of the two clutches 40A, 40B is the next clutch Cn.

The control device 10 outputs a gear engagement command so that the input-gear Gn1 and the output-gear Gn2 are engaged with each other after the actual transmitted torque capacity of the next clutch Cn coincides with the gear engagement suitable capacity CGp. In the example shown in FIG. 11, when the actual transmitted torque capacity of the next clutch Cn has become the minimum value and the actual transmitted torque capacity of the previous clutch Cp has reached the gear engagement suitable capacity CGp, the control device 10 outputs the gear engagement command (t2). Thus, the movable gear of the gears Gn1, Gn2 begins to move toward the fixed gear. Then, in the example of FIG. 11, the engagement of the gears Gn1, Gn2 is completed at t3. The subsequent changes in the target torque capacities Cptg, Cntg and the target engine torque Tetg are similar to the example shown in FIG. 7.

Also, as in the first preferred embodiment, the control device 10 may output the gear engagement command at an earlier time point than when the transmitted torque capacity reaches the gear engagement suitable capacity CGp, so that the gears Gn1, Gn2 are engaged after the transmitted torque capacity of the next clutch Cp reaches the gear engagement suitable capacity CGp. Such processing is carried out, for example, as follows. The control device 10 outputs the gear engagement command when a predetermined time has passed since the time point when the target torque capacity Cptg of the next clutch Cp is set to the gear engagement suitable capacity CGp (in FIG. 11, t1). This predetermined time is determined in advance in consideration of the drive speed of the shift actuator 39 so that the gears Gn1, Gn2 are engaged after the transmitted torque capacity of the next clutch Cn reaches the gear engagement suitable capacity CGn.

Figure 12:
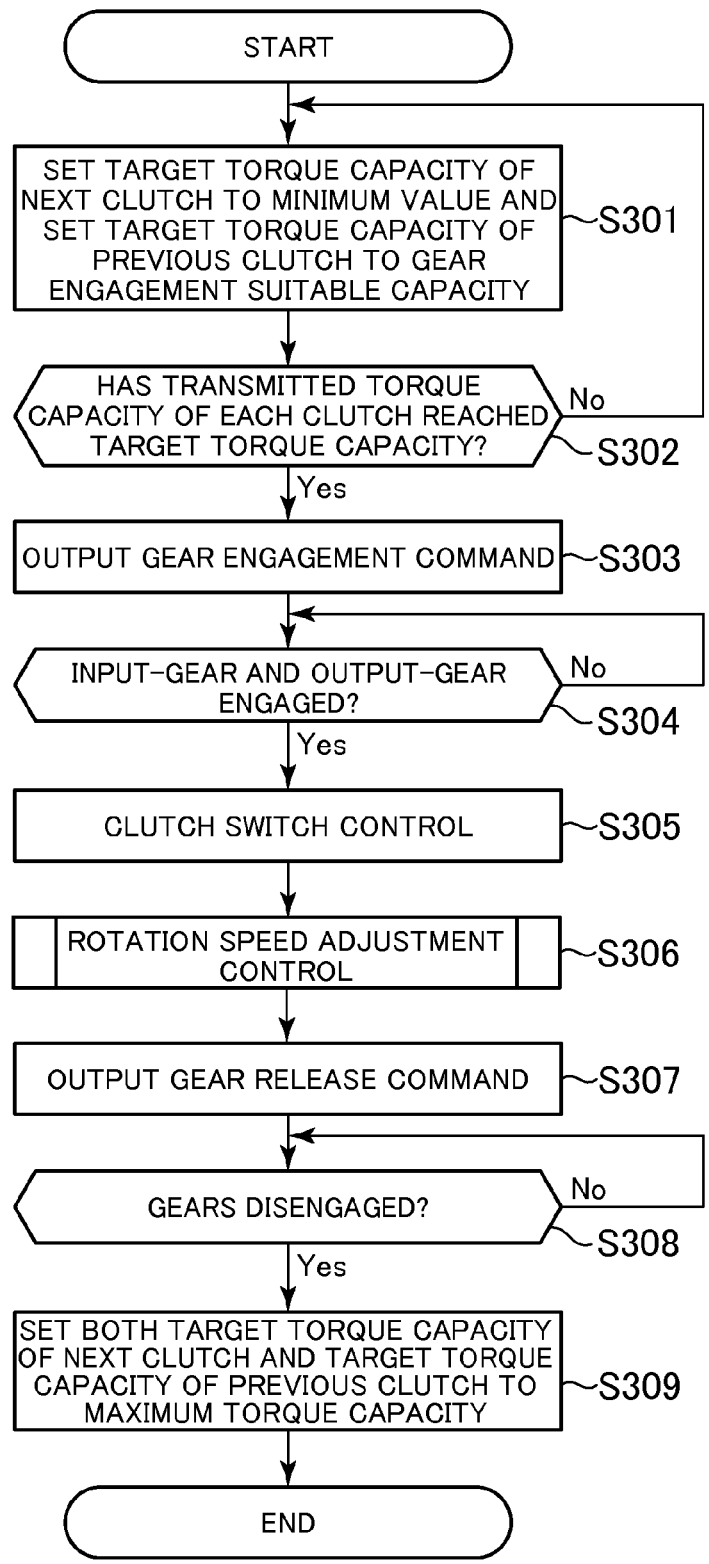
FIG. 12 is a flowchart showing an example of processing executed by the power-on shift-up operation according to the second preferred embodiment of the present invention.

A flow of processing executed in the power-on shift-up operation according to this preferred embodiment will be described. FIG. 12 is a flowchart showing an example of the processing executed in the power-on shift-up operation.

The control device 10 sets the target torque capacity Cntg of the next clutch Cn to the minimum value in response to a gear shift command generated during the execution of the normal travel control (S301). Also, the control device 10 executes the above previous clutch capacity reduction control. Specifically, the control device 10 sets the target torque capacity Cptg of the previous clutch Cp to the gear engagement suitable capacity CGp (S301).

After S301, the control device 10 determines, similarly to S102, whether the transmitted torque capacities of the clutches Cn, Cp detected by the clutch sensors 19c, 19d have respectively reached the target torque capacities Cntg, Cptg set in S301 (S302). Then, when the transmitted torque capacities of the clutches Cn, Cp have reached the target torque capacities Cntg, Cptg, the control device 10 gives a gear engagement command designating the engagement of the gears Gn1, Gn2 of the next transmission mechanism Tn, to the shift actuator 39 (S303). The processing of S304 to S309 is similar to the processing of S104 to S109 shown in FIG. 8, respectively.

Power-off shift-up operation according to the second preferred embodiment will be described. In the power-off shift-up operation, the control device 10 carries out the rotation speed adjustment control prior to the clutch switch control. With respect to other points, the power-off shift-up operation is roughly similar to the power-on shift-up operation.

Figure 13:
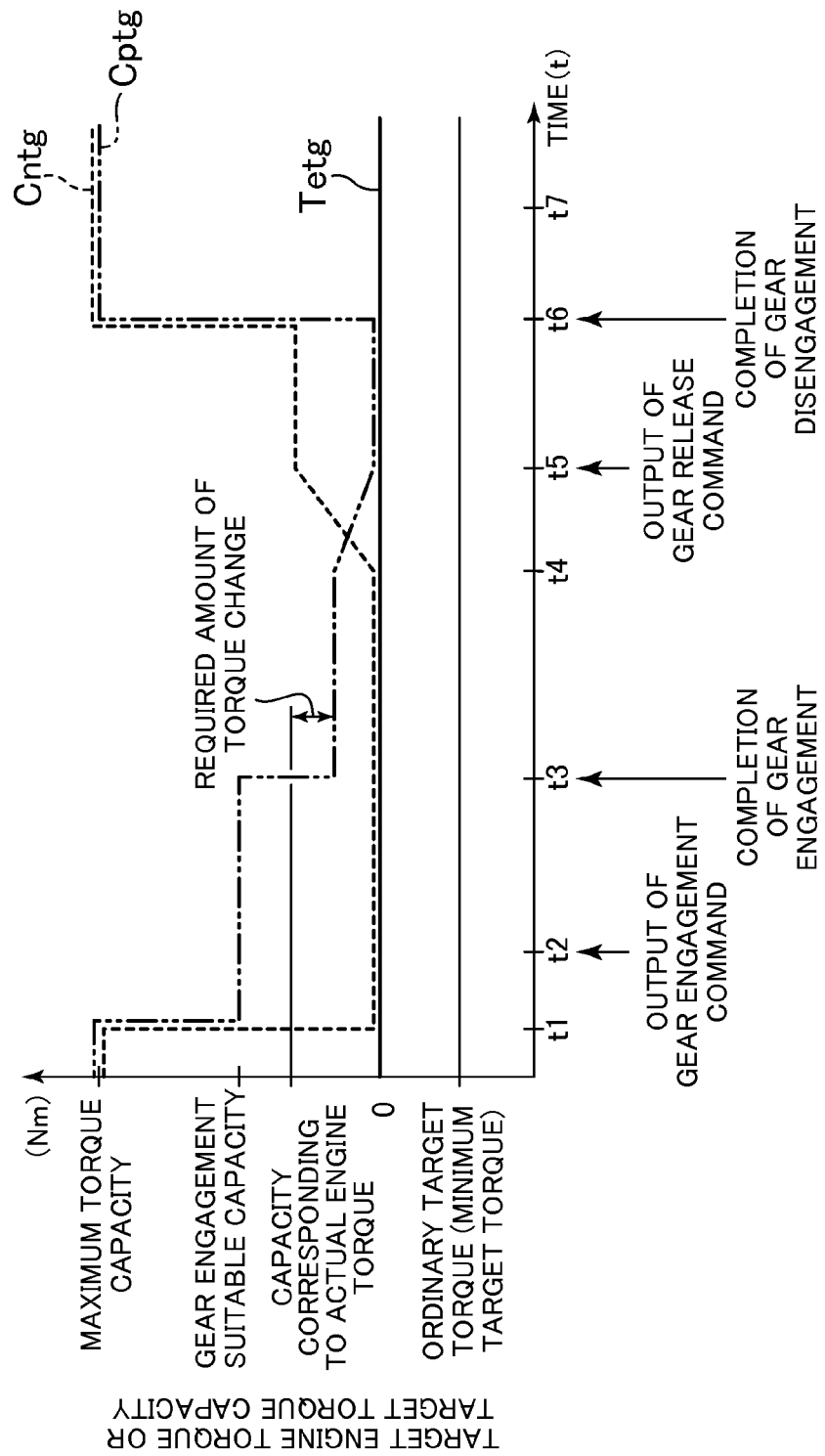
FIG. 13 is a time chart showing an example of change in target torque capacity and target engine torque in the case where power-off shift-up operation according to the second preferred embodiment of the present invention is executed.

FIG. 13 is a time chart showing an example of change in the target torque capacities Cntg, Cptg and the target engine torque Tetg in the case where the power-off shift-up operation is executed. Here, the case where the minimum torque that can be outputted by the engine 20 is the ordinary target torque since the amount of accelerator operation is small, will be described an example.

If a gear shift command is generated at t1 and the operation mode corresponding to the gear shift command is the power-off shift-up operation, the target torque capacity Cntg of the next clutch Cn is set to the minimum value, as in the control of FIG. 11. Also, the target torque capacity Cptg of the previous clutch Cp is set to the gear engagement suitable capacity CGp. Here, since the target engine torque Tetg, which is the ordinary target torque, is set to a negative value, the actual engine torque Te is a negative value, too. Therefore, the gear engagement suitable capacity CGp is calculated based on the absolute value of the actual engine torque Te, and the capacity coefficient k1 and/or the additional capacity C. The gear engagement suitable capacity CGp is a higher value than a capacity corresponding to the absolute value of the actual engine torque Te.

When the actual transmitted torque capacity of the next clutch Cn coincides with the minimum value and the actual transmitted torque capacity of the previous clutch Cp coincides with the gear engagement suitable capacity CGp, the control device 10 outputs a gear engagement command designating the engagement of the gears Gn1, Gn2 of the next transmission mechanism Tn (t2).

When the control device 10 detects that the gears Gn1, Gn2 are engaged at t3, the control device 10 starts the rotation speed adjustment control. In the power-on shift-up operation, the control device 10 lowers the target engine torque Tetg and thus gradually lowers the rotation speed of the engine, solving the difference in rotation speed between the drive member 41 and the driven member 42 of the next clutch Cn. However, in the power-off shift-up operation, where the target engine torque Tetg (ordinary target torque) is the minimum torque, the target engine torque Tetg cannot be lowered. Therefore, the control device 10 lowers the transmitted torque capacity of the previous clutch Cp. Thus, the torque transmitted from the output shaft 32 to the engine 20 through the previous clutch Cp falls and therefore the rotation speed of the engine falls. In the example described here, the control device 10 at t3 sets the target torque capacity Cptg of the previous clutch Cp to a value that is lower than the capacity corresponding to the absolute value of the ordinary target torque by the required amount of torque change. Consequently, in the example shown in the drawing, at t4, the rotation speed of the engine reaches the next gear level-compatible speed and the difference in rotation speed between the driven member 42 and the drive member 41 of the next clutch Cn is solved. After that, the control device 10 starts the clutch switch control. Specifically, the control device 10 gradually raises the target torque capacity Cntg of the next clutch Cn to the capacity corresponding to the actual engine torque Te and also gradually lowers the target torque capacity Cptg of the previous clutch Cp to the minimum value. After that, as in the foregoing description, the control device 10 executes the gear release control, then executes the clutch return control, and completes the gear shift. Up to this point is the description of the power-off shift-up operation according to the second preferred embodiment.

Also, the previous clutch capacity reduction control and the next gear engagement control according to the second preferred embodiment may be executed in the power-on shift-down operation and the power-off shift-down operation. In these operation modes, the rotation speed of the output-gear Gn2 is lower than the rotation speed of the input-gear Gn1. Therefore, when the gears Gn2, Gn1 are engaged, a negative next gear-generated torque (a torque that reduces the rotation speed of the output shaft 32) is generated. By executing the above next gear engagement control in these two operation modes, a sufficient transmitted torque capacity is secured in the previous clutch Cp when the gears Gn1, Gn2 are engaged. Therefore, even if the negative next gear-generated torque is smaller than the actual engine torque Te which is positive or negative, that is, even if the actual engine torque Te cannot compensate for the next gear-generated torque, the negative next gear-generated torque is transmitted to the engine 20 through the previous clutch Cp. Consequently, a gear shift shock generated by the next gear-generated torque is significantly reduced.

Referring to FIG. 10 in the description, for example, if, in the power-off shift-down operation, the torque Te1 inputted to the output shaft 32 from the engine 20 is a negative value and is smaller than the negative next gear-generated torque, the next gear-generated torque is offset by the torque Te1. However, if the torque Te1 is greater than the negative next gear-generated torque in the power-on shift-down operation, or if the torque Te1 has a negative value that is close to 0 in the power-off shift-down operation, the next gear-generated torque is not offset by the torque Te1. Even in such cases, by securing a sufficient transmitted torque capacity in the previous clutch Cp when the gears Gn1, Gn2 are engaged, a torque Tg0 equivalent to the difference between the torque Te1 and the next gear-generated torque is transmitted to the engine 20. Consequently, a gear shift shock significantly reduced.

In the power-off shift-down operation, after the next gear engagement control, the clutch switch control is executed prior to the rotation speed adjustment control, as in the power-on shift-up operation. Therefore, similarly to the control described with reference to FIG. 11, the control device 10 first executes the previous clutch capacity reduction control and lowers the transmitted torque capacity of the previous clutch Cp to the gear engagement suitable capacity CGp. After that, the control device 10 executes the next gear engagement control and engages the gears Gn1, Gn2 with each other. After that, the control device 10 executes the clutch switch control. That is, the control device 10 gradually raises the target torque capacity Cntg of the next clutch Cn toward the capacity corresponding to the ordinary target torque while gradually lowering the target torque capacity Cptg of the previous clutch Cp toward the minimum value from the gear engagement suitable capacity CGp. After that, the control device 10 executes the rotation speed adjustment control. In the rotation speed adjustment control in the power-off shift-down operation, unlike FIG. 11, the target engine torque Tetg is made higher than the ordinary target torque, thus raising the rotation speed of the engine. The subsequent control in the power-off shift-down operation is similar to FIG. 11, and the gear release control and the clutch return control are executed.

Meanwhile, in the power-on shift-down operation, as in the power-off shift-up operation, the rotation speed adjustment control is executed prior to the clutch switch control. Therefore, similarly to the control described with reference to FIG. 13, the control device 10 first executes the previous clutch capacity reduction control and lowers the transmitted torque capacity of the previous clutch Cp to the gear engagement suitable capacity CGp. After that, the control device 10 executes the next gear engagement control and engages the gears Gn1, Gn2 with each other. After that, the control device 10 executes the rotation speed adjustment control. That is, the control device 10 sets the target torque capacity Cptg of the previous clutch Cp to the capacity corresponding to the ordinary target torque and makes the target engine torque Tetg higher than the ordinary target torque. Thus, the rotation speed of the engine rises. Then, after the rotation speed of the engine reaches the next gear level-compatible speed and the difference in rotation speed between the drive member 41 and the driven member 42 of the next clutch Cn is solved, the control device 10 executes the clutch switch control. Specifically, the target torque capacity Cntg of the next clutch Cn is gradually raised while the target torque capacity Cptg of the previous clutch Cp is lowered toward the minimum value. The subsequent control in the power-on shift-down operation is similar to FIG. 13 and the gear release control and the clutch return control are executed.

Third Preferred Embodiment

In a third preferred embodiment of the present invention, the control device 10 executes the following control at the time of shift-up. That is, the control device 10 changes the rotation speed of the engine and thus reduces the difference in rotation speed between the gears Gn1, Gn2 before causing the gears Gn1, Gn2 of the next transmission mechanism Tn to be engaged by the next gear engagement control. Specifically, the control device 10 lowers the actual engine torque Te and changes the rotation speed of the engine toward the next gear level-compatible speed. Then, after the difference between the rotation speed of the engine and the next gear level-compatible speed becomes smaller than a threshold value, that is, after the difference in rotation speed between the gears Gn1, Gn2 become smaller than a threshold value, the control device 10 engages the gears Gn1, Gn2 with each other. Thus, the gear-generated torque generated when the gears Gn1, Gn2 are engaged is significantly reduced and a gear shift shock is prevented.

In this preferred embodiment, the actual engine torque Te is lowered in order to lower the rotation speed of the engine. If this control is executed in the state where the drive force transmitted to the rear wheel 3 (hereinafter, a rear wheel drive force) is higher before a gear shift, good acceleration cannot be achieved (here, the rear wheel drive force is actual engine torque Te×gear ratio in the path to the rear wheel 3 (primary gear ratio R1×gear ratio Rp of the previous transmission mechanism Tp)). Thus, it is desirable that the transmission control according to this preferred embodiment is executed only if the rear wheel drive force is lower than a predetermined threshold value. Also, the control device 10 may start the transmission control according to this preferred embodiment if the acceleration of the vehicle is smaller than a predetermined threshold value.

Figure 14:
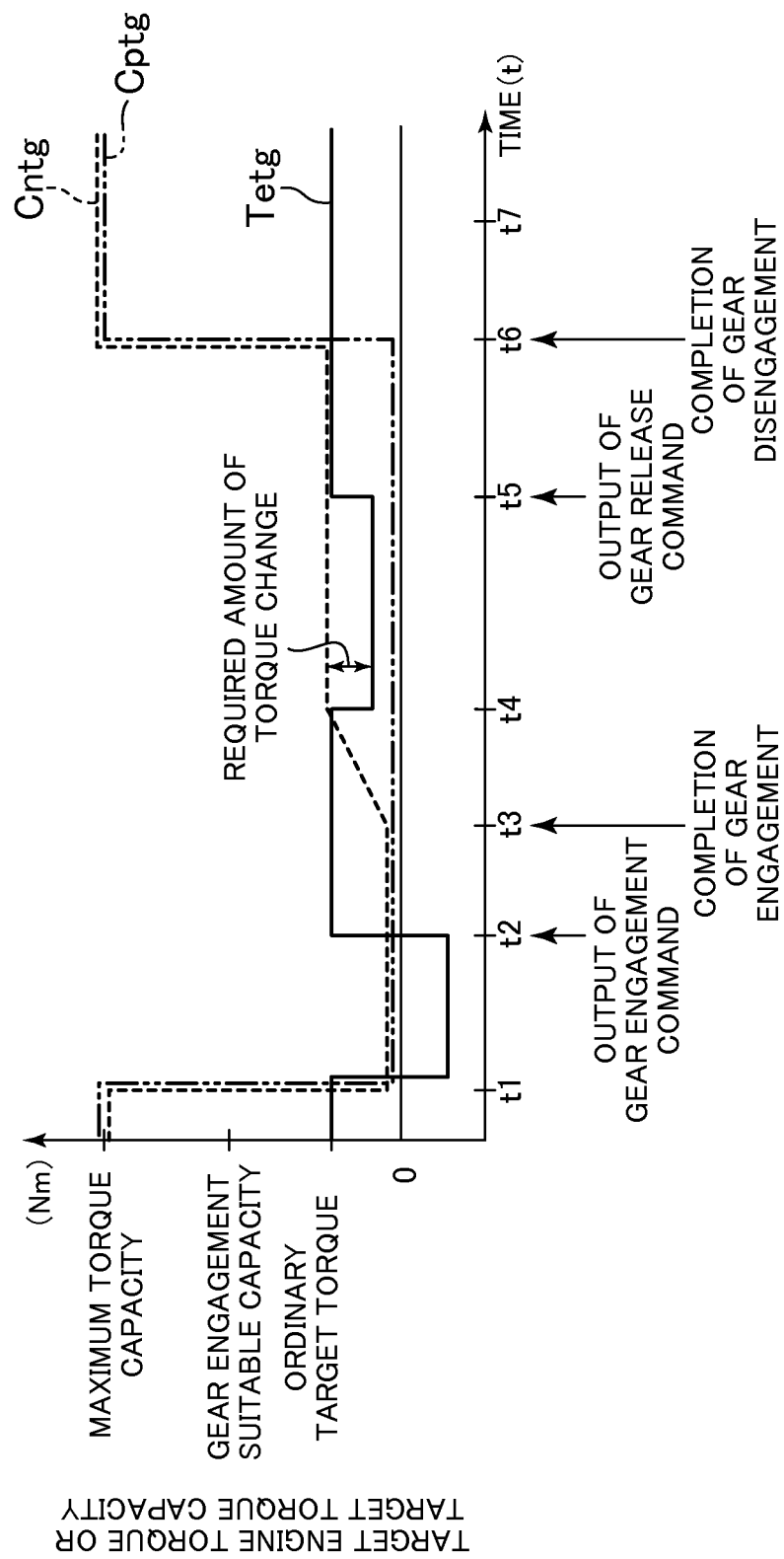
FIG. 14 is a time chart showing an example of change in target torque capacity and target engine torque in the case where power-on shift-up operation according to a third preferred embodiment of the present invention is executed.

FIG. 14 is a time chart showing an example of change in the target torque capacities Cntg, Cptg and the target engine torque Tetg in the case where the power-on shift-up operation is executed. The values represented by individual lines in FIG. 14 are similar to FIG. 7.

As shown in FIG. 14, if a gear shift command is generated at t1, the operation mode corresponding to the gear shift command is the power-on shift-up operation, and the rear wheel drive force is determined to be smaller than a threshold value, the control device 10 executes the previous clutch capacity reduction control and the next clutch capacity reduction control. In this preferred embodiment, the control device 10 sets both the target torque capacity Cptg of the previous clutch Cp and the target torque capacity Cntg of the next clutch Cn to the minimum value. Also, the control device 10 lowers the target engine torque Tetg from the ordinary target torque and sets the target engine torque Tetg to a negative torque calculated by predetermined processing. Thus, the rotation speed of the engine is significantly reduced while change in vehicle speed is prevented.

Even in the state where the transmitted torque capacity of the next clutch Cn is the minimum value, since the drive member 41 and the driven member 42 of the next clutch Cn are partly in contact with each other or the inside of the next clutch Cn is filled with oil, a change in the rotation speed of the engine is transmitted from the drive member 41 to the driven member 42. Therefore, if the rotation speed of the engine falls, the rotation speed of the input-gear Gn1 of the next transmission mechanism Tn falls, too. Since the rotation speed of the input-gear Gn1 is higher than the output-gear Gn2 at the time of shift-up, the rotation speed of the input-gear Gn1 gradually approaches the rotation speed of the output-gear Gn2. As the rotation speed of the engine reaches the next gear level-compatible speed, the rotation speed of the input-gear Gn1 coincides with the rotation speed of the output-gear Gn2.

In the example of FIG. 14, the rotation speed of the engine reaches the next gear level-compatible speed at t2. At this point, the control device 10 restores the target engine torque Tetg to the ordinary target torque and outputs a gear engagement command. Consequently, the gears Gn2, Gn1 are engaged at t3.

After that, the control device 10 sequentially executes the clutch switch control and the rotation speed adjustment control. In the example of FIG. 14, the control device 10 first executes the clutch switch control, raising the target torque capacity Cntg of the next clutch Cn toward the capacity corresponding to the actual engine torque Te and maintaining the target torque capacity Cptg of the previous clutch Cp at the minimum value. Consequently, in the example of FIG. 14, the transmitted torque capacity of the next clutch Cn reaches the capacity corresponding to the actual engine torque Te at t4. Next, the control device 10 executes the rotation speed adjustment control, the previous gear release control, and the clutch return control, in this order. These controls are similar to those described with reference to FIG. 7.

Fourth Preferred Embodiment

In a fourth preferred embodiment of the present invention, in the power-on shift-down operation or in the power-off shift-up operation, the control device 10 executes the following control. That is, the control device 10 executes the rotation speed adjustment control before causing the gears Gn1, Gn2 of the next transmission mechanism Tn to be engaged by the next gear engagement control. Thus, the gears Gn1, Gn2 become engaged in the state where the difference in rotation speed between the gears is reduced. Consequently, the gear-generated torque generated by the engagement of the gears Gn1, Gn2 is significantly reduced and a gear shift shock is prevented.

Figure 15:
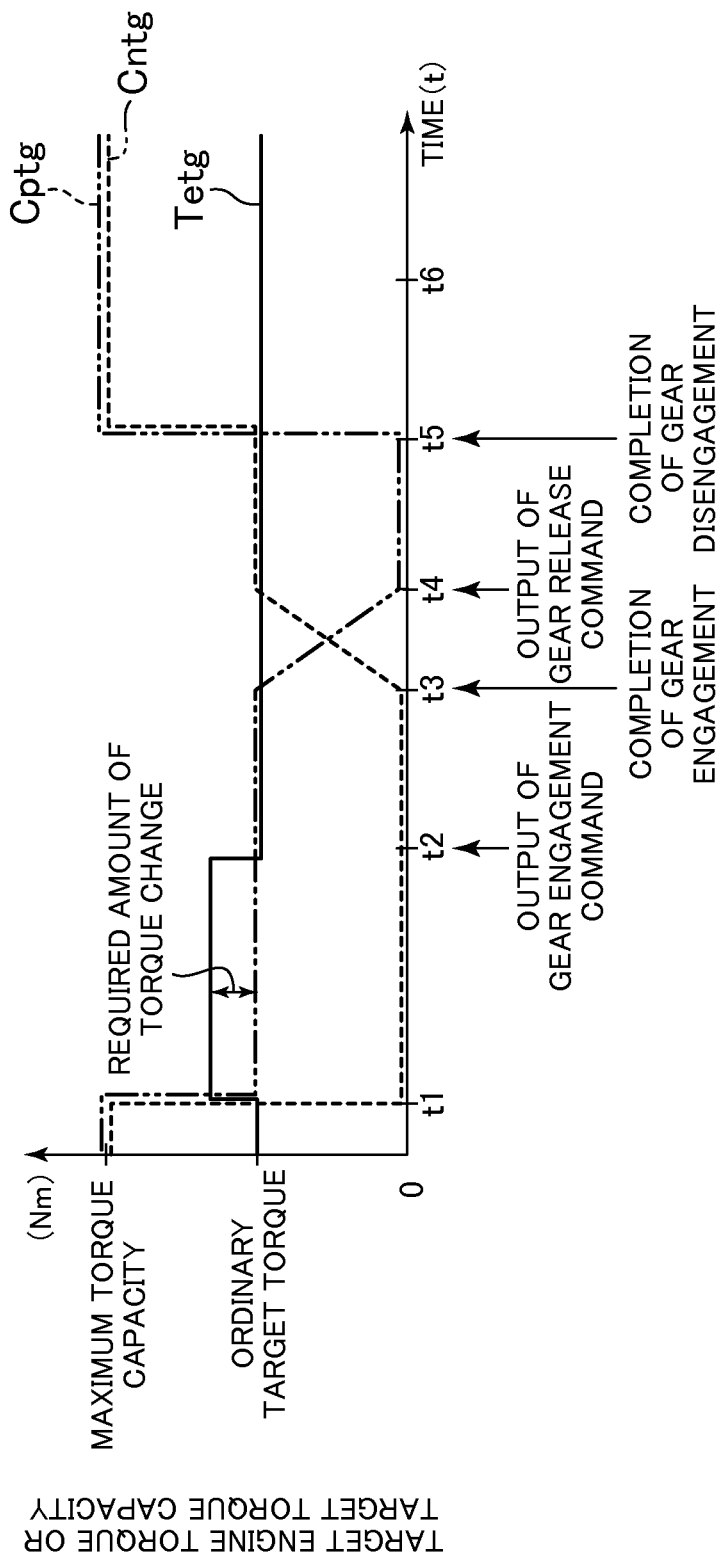
FIG. 15 is a time chart showing an example of change in target torque capacity and target engine torque in the case where power-on shift-up operation according to a fourth preferred embodiment of the present invention is executed.

FIG. 15 is a time chart showing an example of change in the target torque capacities Cntg, Cptg and the target engine torque Tetg in the case where the power-on shift-down operation according to this preferred embodiment is executed. The values represented by individual lines in FIG. 15 are similar to FIG. 7.

If a gear shift command is generated at t1 and the operation mode corresponding to the gear shift command is determined as the power-on shift-down operation, the control device 10 immediately executes the rotation speed adjustment control. Specifically, the control device 10 sets the target torque capacity Cptg of the previous clutch Cp to the capacity corresponding to the ordinary target torque. At the same time, the control device 10 sets the target torque capacity Cntg of the next clutch Cn to the minimum value. Moreover, the control device 10 raises the target engine torque Tetg from the ordinary target torque by the required amount of torque change. Consequently, in the example of FIG. 15, at t2, the rotation speed of the engine reaches the next gear level-compatible speed and the target engine torque Tetg is returned to the ordinary target torque. At this point, the control device 10 outputs a gear engagement command. Consequently, in the example of FIG. 15, the gears Gn1, Gn2 of the next transmission mechanism Tn are engaged at t3. Also, there is a time difference between the gears Gn1, Gn2 of the next transmission mechanism Tn and the output of the gear engagement command. Therefore, the control device 10 may output the gear engagement command before the rotation speed of the engine reaches the next gear level-compatible speed, so that the gears Gn1, Gn2 of the next transmission mechanism Tn are engaged after the rotation speed of the engine reaches the next gear level-compatible speed.

As the gears Gn1, Gn2 are engaged at t3, the control device 10 executes the clutch switch control, gradually raising the target torque capacity Cntg of the next clutch Cn toward the capacity corresponding to the actual engine torque Te and gradually reducing the target torque capacity Cptg of the previous clutch Cp toward the minimum value. The previous gear release control and the clutch return control, which are executed subsequently, are similar to those described above.

The next gear-generated torque can also be reduced by the following method. For example, the control device 10 detects the rotational position (rotational angle) of the input-gear Gn1 and the output-gear Gn2 of the next transmission mechanism Tn. Then, the control device 10 causes the two gears to collide with each other (presses the gears against each other) in the state where the rotational position of the dog-teeth on one gear and the rotational position of the dog-holes on the other gear do not meet each other. By doing so, the difference in rotation speed between the two gears is significantly reduced. Consequently, the gear-generated torque is significantly reduced the moment the two gears are engaged.

Also, the control device 10 may control the engine torque so as to compensate for the gear-generated torque the moment the gears Gn1, Gn2 of the next transmission mechanism Tn are engaged. In the power-on shift-up operation, a positive gear-generated torque is generated. Therefore, in the power-on shift-up operation, when the relative position in the axial direction of the Gn1, Gn2 has become smaller than a threshold value, that is, when the position of the movable gear of the two gears Gn1, Gn2 has reached a predetermined position that is immediately before the engagement with the fixed gear, the control device 10 executes lag control to delay the ignition timing of the engine 20 and instantly lowers the actual engine torque Te. Thus, the gear-generated torque is compensated for by the reduction in the actual engine torque Te, and the generation of a gear shift shock is prevented.

Meanwhile, in the power-on shift-down operation, when the relative position of Gn1, Gn2 has become smaller than a threshold value, the control device 10 outputs a gear engagement command and also reduces the throttle opening and executes lag control. At this point, it is desirable that the reduction in the throttle opening and the lag control are executed in such a way that the actual engine torque Te does not change significantly. Then, when the relative position in the axial direction of Gn1, Gn2 has become smaller than the threshold value, the control device 10 executes the lag control to delay the ignition timing of the engine 20 and instantly lowers the actual engine torque Te. Thus, the gear-generated torque is compensated for by the reduction in the actual engine torque Te, and the generation of a gear shift shock is prevented.

The present invention is not limited to the above-described preferred embodiments and various changes can be made.

For example, the processing to raise or lower the rotation speed of the engine in the rotation speed adjustment control may be changed. For example, in the above-described rotation speed adjustment control, the required amount of torque change preferably is calculated based on the next gear level-compatible speed. However, the required amount of torque change may be a fixed value that is prescribed in advance.

Also, in the clutch switch control, the processing to switch the clutch to transmit the torque, from the previous clutch Cp to the next clutch Cn, may be changed. For example, in the above preferred embodiments, the target torque capacity Cntg of the next clutch Cn preferably is set to the capacity corresponding to the actual engine torque Te. However, the target torque capacity Cntg of the next clutch Cn may also be set to the maximum torque capacity in the clutch switch control.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A control device for a vehicle that includes two paths that transmit an engine torque, each of the two paths includes a clutch and a transmission mechanism arranged downstream of the clutch, the transmission mechanisms in the two paths share an output shaft, and each of the transmission mechanisms includes a first gear rotating together with a driven member of its respective clutch, and a second gear rotating together with the output shaft and engageable with the first gear by a dog clutch, wherein the control device is arranged and programmed to execute:
normal travel control in which a transmitted torque capacity of each of the clutches is set to a value that the clutches have in an engaged state, the transmission mechanism in a previous path that is one of the two paths is set in an engaged state in which the first gear and the second gear are engaged with each other, and the transmission mechanism in a next path that is the other path is set in a neutral state in which the first gear and the second gear are not engaged with each other;
next clutch capacity reduction control in which the transmitted torque capacity of the clutch in the next path is lowered in response to a gear shift command generated during the normal travel control; and
next gear engagement control in which the first gear and the second gear of the transmission mechanism in the next path become engaged with each other in a state in which the transmitted torque capacity of the clutch in the next path is higher than a value at a time when the clutch in the next path is disengaged, after the next clutch capacity reduction control is started.

2. A motorcycle comprising the control device according to claim 1.

3. The control device for vehicle according to claim 1, wherein the control device is arranged and programmed to further execute previous clutch capacity reduction control in which the transmitted torque capacity of the clutch in the previous path is lowered, before the first gear and the second gear of the transmission mechanism in the next path are engaged with each other.

4. The control device for vehicle according to claim 1, wherein in the next clutch capacity reduction control, a target value for the transmitted torque capacity of the clutch in the next path is set higher than a transmitted torque capacity at the time when the clutch in the next path is disengaged.

5. The control device for vehicle according to claim 4, wherein the target value is a predetermined fixed value.

6. The control device for vehicle according to claim 4, wherein the target value is set higher than the transmitted torque capacity at the time when the clutch in the next path is disengaged, when a shift-up command is generated as the gear shift command.

7. The control device for vehicle according to claim 4, wherein the control device is arranged and programmed to further execute clutch switch control in which the target value is raised from the transmitted torque capacity that is higher than the transmitted torque capacity at the time when the clutch in the next path is disengaged, after the first gear and the second gear of the transmission mechanism in the next path are engaged with each other.

8. The control device for vehicle according to claim 4, wherein the target value is calculated based on information related to a difference in rotation speed between the first gear and the second gear which are in a state before the two gears become engaged by the next gear engagement control.

9. The control device for vehicle according to claim 8, wherein the target value is calculated based on a gear level according to the gear shift command as the information related to the difference in rotation speed between the first gear and the second gear.

10. A control device for a vehicle that includes two paths that transmit an engine torque, each of the two paths includes a clutch and a transmission mechanism arranged downstream of the clutch, the transmission mechanisms in the two paths share an output shaft, and each of the transmission mechanisms includes a first gear rotating together with a driven member of its respective clutch, and a second gear rotating together with the output shaft and engageable with the first gear by a dog clutch; wherein the control device is arranged and programmed to execute:
normal travel control in which a transmitted torque capacity of each of the clutches is set to a value that the clutches have in an engaged state, the transmission mechanism in a previous path that is one of the two paths is set in an engaged state in which the first gear and the second gear are engaged with each other, and the transmission mechanism in a next path that is the other path is set in a neutral state in which the first gear and the second gear are not engaged with each other;
previous clutch capacity reduction control in which the transmitted torque capacity of the clutch in the previous path is lowered in response to a gear shift command generated during the normal travel control;
next clutch capacity reduction control in which the transmitted torque capacity of the clutch in the next path is lowered in response to the gear shift command; and
next gear engagement control in which the first gear and the second gear of the transmission mechanism in the next path become engaged with each other in a state in which the transmitted torque capacity of the clutch in the previous path is higher than a transmitted torque capacity corresponding to a torque outputted by the engine, after the previous clutch capacity reduction control and the next clutch capacity reduction control are started.

11. The control device for vehicle according to claim 10, wherein in the previous clutch capacity reduction control, a target value for the transmitted torque capacity of the clutch in the previous path is set higher than the transmitted torque capacity corresponding to the torque outputted by the engine.

12. A motorcycle comprising the control device according to claim 10.

* * * * *